(12) United States Patent
Lim et al.

(10) Patent No.: US 10,827,174 B2
(45) Date of Patent: *Nov. 3, 2020

(54) METHOD AND APPARATUS FOR ENCODING VIDEO, AND DECODING METHOD AND APPARATUS

(71) Applicant: Electronics and Telecommunications Research Institute, Daejeon (KR)

(72) Inventors: Sung Chang Lim, Daejeon (KR); Hui Yong Kim, Daejeon (KR); Se Yoon Jeong, Daejeon (KR); Suk Hee Cho, Daejeon (KR); Jong Ho Kim, Daejeon (KR); Ha Hyun Lee, Seoul (KR); Jin Ho Lee, Daejeon (KR); Jin Soo Choi, Daejeon (KR); Jin Woong Kim, Daejeon (KR); Chie Teuk Ahn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 83 days.

This patent is subject to a terminal disclaimer.

(21) Appl. No.: 16/236,019

(22) Filed: Dec. 28, 2018

(65) Prior Publication Data

US 2019/0141326 A1 May 9, 2019

Related U.S. Application Data

(63) Continuation of application No. 15/801,423, filed on Nov. 2, 2017, now Pat. No. 10,212,422, which is a
(Continued)

(30) Foreign Application Priority Data

Aug. 17, 2010 (KR) .......................... 10-2010-0079104
Dec. 7, 2010 (KR) .......................... 10-2010-0124181
(Continued)

(51) Int. Cl.
*H04N 19/00* (2014.01)
*H04N 19/124* (2014.01)
(Continued)

(52) U.S. Cl.
CPC ......... *H04N 19/124* (2014.11); *H04N 19/119* (2014.11); *H04N 19/14* (2014.11);
(Continued)

(58) Field of Classification Search
CPC .... H04N 19/124; H04N 19/119; H04N 19/14; H04N 19/176; H04N 19/196; H04N 19/33; H04N 19/463; H04N 19/70
See application file for complete search history.

(56) References Cited

U.S. PATENT DOCUMENTS 5,487,086 A * 1/1996 Bhaskar .................. G10L 19/04
375/243
7,460,041 B2 * 12/2008 Yang .................. H03M 7/4006
341/106
(Continued)

FOREIGN PATENT DOCUMENTS

CN   1647541 A   7/2005
CN   1722836 A   1/2006
(Continued)

OTHER PUBLICATIONS

Kazushi Sato, Proposal on Large Block Structure and Quantization, Joint Collaborative Team on Video Coding (JCT-VC) of ITU-T SG16 WP3 and ISO/IEC JTC1/SC29/WG11, 3rd Meeting, Oct. 7-15, 2010, pp. 1-8, Guangzhou, CN.
(Continued)

*Primary Examiner* — Frank F Huang
(74) *Attorney, Agent, or Firm* — Capitol IP Law Group, PLLC

(57) ABSTRACT

The present invention relates to a video encoding method and apparatus for setting and encoding quantization param-
(Continued)

US 10,827,174 B2
Page 2 eters, and to a video decoding method and apparatus for decoding and setting quantization parameters in a video encoding and decoding apparatus which uses blocks having various sizes and depths as encoding and decoding units.

7 Claims, 9 Drawing Sheets

Related U.S. Application Data continuation of application No. 15/489,290, filed on Apr. 17, 2017, now Pat. No. 9,838,691, which is a continuation of application No. 13/808,433, filed as application No. PCT/KR2011/006052 on Aug. 17, 2011, now Pat. No. 9,699,449.

(30) Foreign Application Priority Data

Mar. 22, 2011 (KR) .................. 10-2011-0025572
May 27, 2011 (KR) .................. 10-2011-0050852

(51) Int. Cl.
| | |
|---|---|
| H04N 19/196 | (2014.01) |
| H04N 19/463 | (2014.01) |
| H04N 19/176 | (2014.01) |
| H04N 19/70 | (2014.01) |
| H04N 19/119 | (2014.01) |
| H04N 19/14 | (2014.01) |
| H04N 19/33 | (2014.01) |

(52) U.S. Cl.
CPC ......... *H04N 19/176* (2014.11); *H04N 19/196* (2014.11); *H04N 19/33* (2014.11); *H04N 19/463* (2014.11); *H04N 19/70* (2014.11)

(56) References Cited

U.S. PATENT DOCUMENTS

| | | | | |
|---|---|---|---|---|
| 8,135,062 | B1* | 3/2012 | Cote | H04N 19/176 |
| | | | | 375/240.03 |
| 2007/0030180 | A1* | 2/2007 | Yang | H04N 19/44 |
| | | | | 341/50 |
| 2009/0067493 | A1* | 3/2009 | Jun | H04N 19/172 |
| | | | | 375/240.03 |
| 2010/0074338 | A1 | 3/2010 | Yamori et al. | |
| 2010/0086029 | A1 | 4/2010 | Chen et al. | |
| 2011/0274162 | A1 | 11/2011 | Zhou et al. | |
| 2011/0279644 | A1* | 11/2011 | Suh | H04N 21/2362 |
| | | | | 348/43 |
| 2011/0292999 | A1 | 12/2011 | Jeong et al. | |
| 2012/0114034 | A1 | 5/2012 | Huang et al. | |
| 2013/0156099 | A1 | 6/2013 | Sasai et al. | |
| 2014/0013202 | A1 | 1/2014 | Schlumberger | |
| 2017/0147496 | A1 | 5/2017 | Sasanka | |

FOREIGN PATENT DOCUMENTS

| | | | |
|---|---|---|---|
| CN | 101356823 | A | 1/2009 |
| CN | 101375609 | A | 2/2009 |
| EP | 2579594 | A1 | 4/2013 |
| JP | 06209469 | A | 7/1994 |
| JP | 08181988 | A | 7/1996 |
| JP | 2008153802 | A | 7/2008 |
| JP | 2011501532 | A | 1/2011 |
| JP | 2012191294 | A | 10/2012 |
| JP | 2012227612 | A | 11/2012 |
| JP | 2013531942 | A | 8/2013 |
| JP | 2013542689 | A | 11/2013 |
| JP | 2017130948 | A | 7/2017 |
| KR | 1020080104060 | A | 11/2008 |
| KR | 1020090028369 | A | 3/2009 |
| KR | 1020090040032 | A | 4/2009 |
| KR | 1020090122161 | A | 11/2009 |
| WO | 2008126135 | A1 | 10/2008 |
| WO | 2009035210 | A1 | 3/2009 |
| WO | 2011140211 | A2 | 11/2011 |
| WO | 2011142279 | A1 | 11/2011 |
| WO | 2011152518 | A1 | 12/2011 |
| WO | 2011156458 | A1 | 12/2011 |
| WO | 2012042890 | A1 | 4/2012 |
| WO | 2012062161 | A1 | 5/2012 |

OTHER PUBLICATIONS

Madhukar Budagavi et al., Delta QP signaling at sub-LCU level, Joint Collaborative Team on Video Coding (JCT-VC) of ITU-T SG16 WP3 and ISO/IEC JTC1/SC29/WG11, 4th Meeting, Jan. 20-28, 2011, Daegu, KR.

Test Model under Consideration, Joint Collaborative Team on video Coding (JCT-VC) of ITU-T SG16 WP3 and ISO/IEC JTC1/SC29/WG11, Document JCTVC-A205, Apr. 15-23, 2010, pp. 1-16, 1st Meeting, Dresden, DE.

"R-D based quantization in H.264", Proc. SPIE, vol. 7443, pp. 744314-744314, 2009.

HEVC Joint Collaborative Team on Video Coding (JCT-VC) of ITU-T SG16 WP3 and ISO/IEC JTC1/SC29/WG11 3rd Metting: Guangzhou, CN, Oct. 7-15, 2010.

Ken McCann et al., "Samsung's Response to the Call for Proposals on Video Compression Technology," JCT-VC of ITU-T SG16 WP3 and ISO/IEC JTC1/SC29/WG11, JCTVC-A124, Apr. 2010, pp. 1-42.

Marta Karczewicz et al., Video Coding Technology Proposal by Qualcomm Inc., JCT-VC, 2010, Qualcomm Inc., Dresden, DE.

Rate Distortion Optimized Quantization, International Telecommunication Union, Apr. 2008, Qualcomm Inc.

Yu Sun et al., An Incremental Basic Unit Level QP Determination Algorithm for H.264/AVC Rate Control, Visual Communications and Image Processing, SPIE-IS&T, 2009, vol. 7257, San Jose.

U.S. Appl. No. 61/411,066, filed Nov. 8, 2010, Yu-Wen Huang et al.

* cited by examiner

METHOD AND APPARATUS FOR ENCODING VIDEO, AND DECODING METHOD AND APPARATUS

CROSS-REFERENCE TO RELATED APPLICATION

The present application is a continuation application of U.S. application number Ser. No. 15/801,423, filed on Nov. 2, 2017, which is a continuation application of U.S. application Ser. No. 15/489,290, filed on Apr. 17, 2017, which is a continuation application of U.S. application Ser. No. 13/808,433, filed on Jan. 4, 2013 with the United States Patent and Trademark Office, which is a U.S. national stage patent application of PCT/KR2011/006052 filed on Aug. 17, 2011, which claims priority to Korean patent applications: KR10-2010-0079104 filed on Aug. 17, 2010; KR10-2010-0124181 filed on Dec. 7, 2010; KR10-2011-0025572 filed on Mar. 22, 2011; and KR10-2011-0050852 filed on May 27, 2011 with the Korean Intellectual Property Office, which is incorporated herein by reference in its entirety.

TECHNICAL FIELD

The present invention relates to an image encoding and decoding technology for encoding and decoding an image by setting a quantization parameter of an encoding object block.

BACKGROUND ART

The demand for a high resolution and high quality image such as a high definition (HD) image and an ultra high definition (UHD) image has recently increased in various applications. As resolution and quality of image data have increased, a data amount relatively increases as compared to existing image data. Therefore, when the image data is transmitted using a medium such as an existing wired and wireless broadband circuit or is stored using an existing storage medium, a transmission cost and a storage cost increase. In order to solve these problems generated due to the increase in the resolution and quality of the image data, high efficiency image compression technologies may be utilized. As an image compression technology, there are various technologies such as an inter prediction technology in which pixels values included in a current picture are predicted from pictures before or after the current picture, an intra prediction technology in which pixel values included in a current picture is predicted using pixel information in the current picture, and an entropy encoding technology in which a short code is allocated to a value having high appearance frequency and a long code is allocated to a value having low appearance frequency. The image data may be transmitted and stored in a state in which it is effectively compressed using these image compression technologies.

DISCLOSURE

Technical Problem

The present invention provides a method and an apparatus for encoding an image and a method and an apparatus for decoding an image in which a quantization parameter is adaptively set according to block information of an encoding object block or block information of a decoding object block to effectively perform quantization, deblocking filtering, entropy encoding/decoding, inter prediction, rate control, rate-distortion optimization, and the like.

Technical Solution

In an aspect, there is provided a method for decoding an image, the method including: receiving block information of a decoding object block; and calculating a quantization parameter based on the block information of the decoding object block.

The block information may be at least one of information on a size and information on a depth of the decoding object block.

The calculating of the quantization parameter based on the block information of the decoding object block may include receiving at least one of information on a size and information on a depth of the decoding object block from the block information and setting a quantization parameter of a predetermined decoding object block having a size smaller than a predetermined size so as to be the same as a quantization parameter set at the predetermined size.

The calculating of the quantization parameter based on the block information of the decoding object block may include calculating the quantization parameter of the decoding object block using an equation or a value derived based on the block information of the decoding object block.

The calculating of the quantization parameter based on the block information of the decoding object block may include calculating the quantization parameter of the decoding object block using quantization parameter changeable information of the decoding object block.

The calculating of the quantization parameter based on the block information of the decoding object block may include decoding the quantization parameter of the decoding object block based on whether or not a residual signal to be decoded that is included in the decoding object block is present.

The decoding object block may be a coding unit.

In another aspect, there is provided a method for decoding an image, the method including: decoding a residual quantization parameter of a decoding object block; and predicting a quantization parameter of the decoding object block based on block information of the decoding object block.

The decoding of the residual quantization parameter of the decoding object block may be omitted when the decoding object block has a size smaller than a specific size of a block.

The predicting of the quantization parameter of the decoding object block may include predicting a quantization parameter of a predetermined decoding object block using a quantization parameter of a decoding object block having a size larger than that of the predetermined decoding object block.

The predicting of the quantization parameter of the decoding object block may include predicting the quantization parameter of the decoding object block using at least one of a quantization parameter of a block that is decoded before the decoding object block and a quantization parameter of a block that is present at the left based on the decoding object block and previously decoded.

The predicting of the quantization parameter of the decoding object block may include predicting the quantization parameter of the decoding object block using a quantization parameter of a decoding object block defined in a sequence parameter set (SPS), a picture parameter set (PPS), or a slice header.

The predicting of the quantization parameter of the decoding object block may include predicting the quantization parameter of the decoding object block based on similarity in a decoding parameter between the decoding object block and a block that is previously decoded before the decoding object block.

The decoding object block may be a coding unit.

The predicting of the quantization parameter of the decoding object block may include predicting the quantization parameter of the decoding object block using a quantization parameter of an upper block based on the decoding object block when the decoding object block is intra-decoded using restored pixels of the upper block and predicting the quantization parameter of the decoding object block using a quantization parameter of a left block based on the decoding object block when the decoding object block is intra-decoded using restored pixels of the left block.

The predicting of the quantization parameter of the decoding object block may include predicting the quantization parameter of the decoding object block using a quantization parameter of an adjacent block of the decoding object block that is decoded in the same prediction mode as that of the decoding object block.

The predicting of the quantization parameter of the decoding object block may include predicting the quantization parameter of the decoding object block based on a quantization parameter of a block within a reference picture indicated by motion information of the decoding object block using the motion information when the decoding object block is inter-decoded.

The predicting of the quantization parameter of the decoding object block may include predicting the quantization parameter of the decoding object block using a quantization parameter of a block having the same spatial position as that of the decoding object block in a slice or a picture that is previously decoded.

The predicting of the quantization parameter of the decoding object block may include predicting the quantization parameter of the decoding object block using a set of quantization parameters of an adjacent block of the decoding object block.

The predicting of the quantization parameter of the decoding object block using the set of quantization parameters of an adjacent block of the decoding object block may include predicting the quantization parameter of the decoding object block based on the identification information determining a quantization parameter used for prediction among the quantization parameters included in the set of quantization parameters of the adjacent block or predicting that a quantization parameter having a median value among the quantization parameters included in the set of quantization parameters of the adjacent block is the quantization parameter of the decoding object block.

Advantageous Effects

As set forth above, according to the embodiments of the present invention, the quantization parameter are adaptively set according to the block information of the encoding object block or the block information of the decoding object block to effectively perform quantization/inverse quantization, deblocking filtering, entropy encoding/decoding, inter prediction, rate control, rate-distortion optimization, and the like, thereby making it possible to improve encoding and decoding performance.

MODE FOR INVENTION

Figure 1:
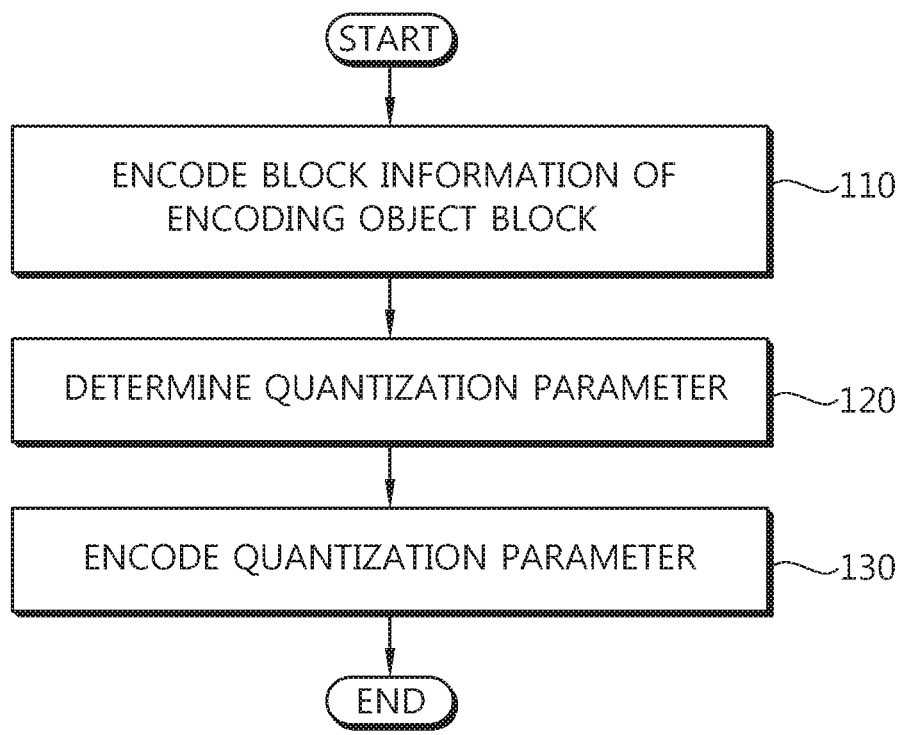
FIG. 1 is a flow chart provided in order to describe a method for encoding an image according to an embodiment of the present invention.

Hereinafter, embodiments of the present invention will be described in detail with reference to the accompanying drawings. However, the present invention will be not limited or restricted to embodiments below. Like reference numerals proposed in each drawing denote like components.

Block information to be described below may include at least one of a type of a block such as a coding unit (CU), a prediction unit (PU), a transform unit (TU), or the like, a size of the block, a depth of the block, and an encoding/decoding order of the block. Here, the block means encoding and decoding object blocks having various sizes and forms, and may have a geometric shape that may be represented two-dimensionally, such as a rectangle, a square, a trapezoid, a triangle, a pentagon, or the like.

Here, the above-mentioned block means a unit of image encoding and decoding. At the time of the image encoding and decoding, the unit of the image encoding and decoding indicates a divided unit when a single image is divided into subdivided blocks and then encoded or decoded. Therefore, it may be called a block, a macroblock, a coding unit, a prediction unit, a transform unit, or the like. A single block may be further divided into sub-blocks having a smaller size. Terms used in the present description are used in order to appropriately represent preferred embodiments of the present invention and may be construed in different ways according to the intention of users or operators, customary practice in the art to which the present invention pertains. Therefore, the definitions of terms used in the present description should be construed based on the contents throughout the specification.

Here, a prediction block means a basic coding/decoding unit of a prediction process such as inter prediction, intra prediction, or the like, and a transform block means a basic coding/decoding unit of a process of performing transform, inverse transform, quantization, inverse quantization, entropy encoding of a residual signal, and entropy decoding of the residual signal. Here, the entropy encoding means that symbol values are encoded using a method such as an arithmetic encoding method or a variable length encoding method to thereby generate a bitstream, and the entropy decoding means that the symbol values are decoded from the bitstream using a method such as an arithmetic decoding method or a variable length decoding method.

FIG. 1 is a flow chart provided in order to describe a method for encoding an image according to an embodiment of the present invention.

First, in operation (110), an apparatus for encoding an image may encode block information of an encoding object block.

As an example, the apparatus for encoding an image may entropy-encode the block information of the encoding object block to thereby generate a bitstream.

As another example, the apparatus for encoding an image may entropy-encode the block information of the encoding object block in any one of a sequence parameter set (SPS), a picture parameter set (PPS), and a slice header in a configuration of the bitstream.

More specifically, the apparatus for encoding an image may entropy-encode the block information such as max_coding_unit_width indicating a maximum width in a size of a coding unit, max_coding_unit_height indicating a maximum height in the size of the coding unit, max_coding_unit_hierarchy_depth indicating a maximum hierarchy depth of the coding unit, log2_min_coding_ unit_size_minus3 indicating a minimum size of the coding unit, log2_min_transform_unit_size_minus2 indicating a minimum size of a transform unit, max_transform_unit_hierarchy_depth indicating a maximum hierarchy depth of the transform unit, log2_diff_max_min_coding_block_size indicating a difference between minimum and maximum sizes of the coding unit, log2_diff_max_min_ transform_block_size indicating a difference between minimum and maximum sizes of the transform unit, max_transform_hierarchy_depth_inter indicating a maximum depth of an inter encoded transform unit, max_transform_hierarchy_depth_intra indicating a maximum depth of an intra encoded transform unit, and the like, in any one of the sequence parameter set (SPS), the picture parameter set (PPS), and the slice header in the configuration of the bitstream.

Then, in operation (120), the apparatus for encoding an image may determine a quantization parameter of the encoding object block based on the block information of the encoding object block. Here, the quantization parameter (QP) means a parameter value determining a step size of quantization and inverse quantization.

As an example, the apparatus for encoding an image may determine the quantization parameter of the encoding object block using the following methods.

1) The apparatus for encoding an image may perform determination so that the same quantization parameter is used in each of a sequence unit, a picture unit, and a slice unit.

2) In addition, the apparatus for encoding an image may determine a single quantization parameter per a largest coding tree block (LCTB) or a largest coding unit (LCU).

3) In addition, the apparatus for encoding an image may determine a single quantization parameter per a smallest coding tree block (SCTB) or a smallest coding unit (SCU).

4) In addition, the apparatus for encoding an image may determine a single quantization parameter per a prediction unit regardless of a size or a depth of the prediction unit.

5) In addition, the apparatus for encoding an image may determine a single quantization parameter per a transform unit regardless of a size or a depth of the transform unit.

6) In addition, the apparatus for encoding an image may determine a single quantization parameter in a specific depth or a specific size of the prediction unit.

7) In addition, the apparatus for encoding an image may determine a single quantization parameter at a specific depth or a specific size of the transform unit. Here, a configuration in which the quantization parameter is determined based on a specific depth or a specific size of the coding unit, a specific depth or a specific size of the prediction unit, and a specific depth or a specific size of the transform unit will be described with reference to the following Table 1, Table 2, Table 3, Table 4, Table 6, Table 7, Table 8, Table 9, Table 10, Table 11, Table 12, Table 13, and Table 14.

8) In addition, the apparatus for encoding an image may determine a quantization parameter of an encoding object block based on block information defined in a sequence parameter set (SPS), a picture parameter set (PPS), or a slice header.

9) In addition, the apparatus for encoding an image may determine a quantization parameter based on whether or not a residual signal is present in an encoding object block. As an example, in the absence of the residual signal in the encoding object block, the apparatus for encoding an image may not determine the quantization parameter. Here, the apparatus for encoding an image may determine whether or not the residual signal is present using a coded block pattern, a coded block flag, or the like.

10) In addition, the apparatus for encoding an image may determine a quantization parameter of an encoding object block based on an equation or a value derived using block information of the encoding object block.

11) In addition, the apparatus for encoding an image may determine a single quantization parameter using any one of a size of a transform unit (log2_min_transform_ unit_size_minus2), a depth of the transform unit (max_transform_unit_hierarchy_depth), log2_diff max_min_coding_block_size indicating a difference between minimum and maximum sizes of a coding unit, log2_min_transform_ block_size_minus2 indicating a minimum size of the transform unit (a transform block), log2_diff_max_min_transform_ block_size indicating a difference between minimum and maximum sizes of the transform unit, max_transform_hierarchy_depth_inter indicating a maximum depth of an inter encoded transform unit, and max_transform_hierarchy_depth_intra indicating a maximum depth of an intra encoded transform unit that are defined in the SPS, PPS, or the slice header.

12) In addition, the apparatus for encoding an image may determine a single quantization parameter using any one of a size of a coding unit (log2_min_coding_unit_ size_minus3), a depth of the coding unit (max_coding_unit_hierarchy_depth), log2_diff_max_min_coding_block_size indicating a difference between minimum and maximum sizes of the coding unit, log2_min_transform_block_size_minus2 indicating a minimum size of the transform unit (a transform block), log2_diff_max_min_transform_block_size indicating a difference between minimum and maximum sizes of the transform unit, max_transform_hierarchy_depth_inter indicating a maximum depth of an inter encoded transform unit, and max_transform_hierarchy_depth_intra indicating a maximum depth of an intra encoded transform unit that are defined in the SPS, PPS, or the slice header.

13) In addition, the apparatus for encoding an image may determine a quantization parameter of an encoding object block within a sequence, within a picture, within a slice, within a LCTB, or the like. Here, the apparatus for encoding an image may determine and change the quantization parameter only in a corresponding unit using quantization parameter changeable information representing a change unit. For example, the apparatus for encoding an image may add qp_change_allowed_flag, which is a syntax element associated with the quantization parameter changeable information, to the PPS. Here, when a logical value of a corresponding syntax element is 1, the apparatus for encoding an image may change the quantization parameter in a unit (a slice, a coding unit (CU), a prediction unit (PU), a transform unit (TU), and the like) lower than a picture and determine the quantization parameter of the encoding object block according to the changed value. In addition, when the logical value of the corresponding syntax element is 0, the apparatus for encoding an image may not change the quantization parameter in the unit lower than the picture.

14) In addition, when the apparatus for encoding an image determines the quantization parameter of the encoding object block using the above-mentioned methods 1) to 12), it may encode a syntax element representing information of the quantization parameter together with a size or a depth of a block in the PPS, the SPS, or the slice header. Further, the apparatus for encoding an image may set the quantization parameter only up to at a specific depth or specific size of the block according to depths or sizes of each of the coding unit, the prediction unit, and the transform unit based on the block information of the encoding object block. Here, in the presence of a block having a depth deeper than a specific depth of the block in which the quantization parameter is set, the apparatus for encoding an image may set a quantization parameter of the block having the deeper depth so as to be the same as the quantization parameter set at the specific depth. In addition, qp_hierarchy_depth or log2_qp_unit_size may be individually applied to each of the coding unit, the prediction unit, and the transform unit. Here, qp_hierarchy_depth indicates a syntax element representing a specific depth of the block in which the quantization parameter is set, and log2_qp_unit_size indicates a syntax element representing a specific size of the block in which the quantization parameter is set. A more detailed configuration will be described below with reference to Table 1, Table 2, Table 3, Table 4, Table 6, Table 7, Table 8, Table 9, Table 10, Table 11, Table 12, Table 13, and Table 14.

The quantization parameter of the encoding object block may be determined by at least one of the methods for determining the quantization parameter of the encoding object block or a combination thereof.

When the quantization parameter of the encoding object block is determined, in the presence of a block having a depth deeper than a specific depth of the block in which the quantization parameter is determined, the apparatus for encoding an image may determine the quantization parameter of the block having the deeper depth so as to be the same as the quantization parameter determined at the specific depth. In addition, in the presence of a block having a size smaller than a specific size of the block in which the quantization parameter is determined, the apparatus for encoding an image may determine a quantization parameter of the block having the smaller size so as to be the same as the quantization parameter determined at the specific size.

Next, in operation (130), the apparatus for encoding an image may encode the determined quantization parameter.

As an example, the apparatus for encoding an image may entropy-encode the quantization parameter of the encoding object block to thereby generate a bitstream.

As another example, the apparatus for encoding an image may encode the quantization parameter of the encoding object block using any one of the methods 1) to 14) for determining a quantization parameter of an encoding object block as described in operation (120). For example, in the case of using the method 1) or 2), the apparatus for encoding an image may encode a single quantization parameter per the LCTB or the SCTB. A process of encoding the quantization parameter of the encoding object block using any one of the methods 3) to 14) is similar to the process of determining the quantization parameter in operation (120). Therefore, an overlapped description thereof will be omitted.

When the quantization parameter of the encoding object block is encoded, in the presence of a block having a depth deeper than a specific depth of the block in which the quantization parameter is encoded, the apparatus for encoding an image may omit the encoding of the quantization parameter of the block having the deeper depth. In addition, in the presence of a block having a size smaller than a specific size of the block in which the quantization parameter is encoded, the apparatus for encoding an image may omit the encoding of the quantization parameter of the block having the smaller size.

Meanwhile, when the apparatus for encoding an image and an apparatus for decoding an image previously know the block information of the encoding object block or a bitstream is previously present, operation (110) may be omitted in FIG. 1. That is, since the apparatus for encoding an image previously knows the block information of the encoding object block, an operation of entropy-encoding the block information of the encoding object block to thereby generate a bitstream may be omitted.

Likewise, when the apparatus for encoding an image and the apparatus for decoding an image previously knows the quantization parameter of the encoding object block, operation (130) may be omitted in FIG. 1. That is, since the apparatus for encoding an image previously knows the quantization parameter of the encoding object block, an operation of entropy-encoding the quantization parameter of the encoding object block to thereby generate a bitstream may be omitted.

Figure 2:
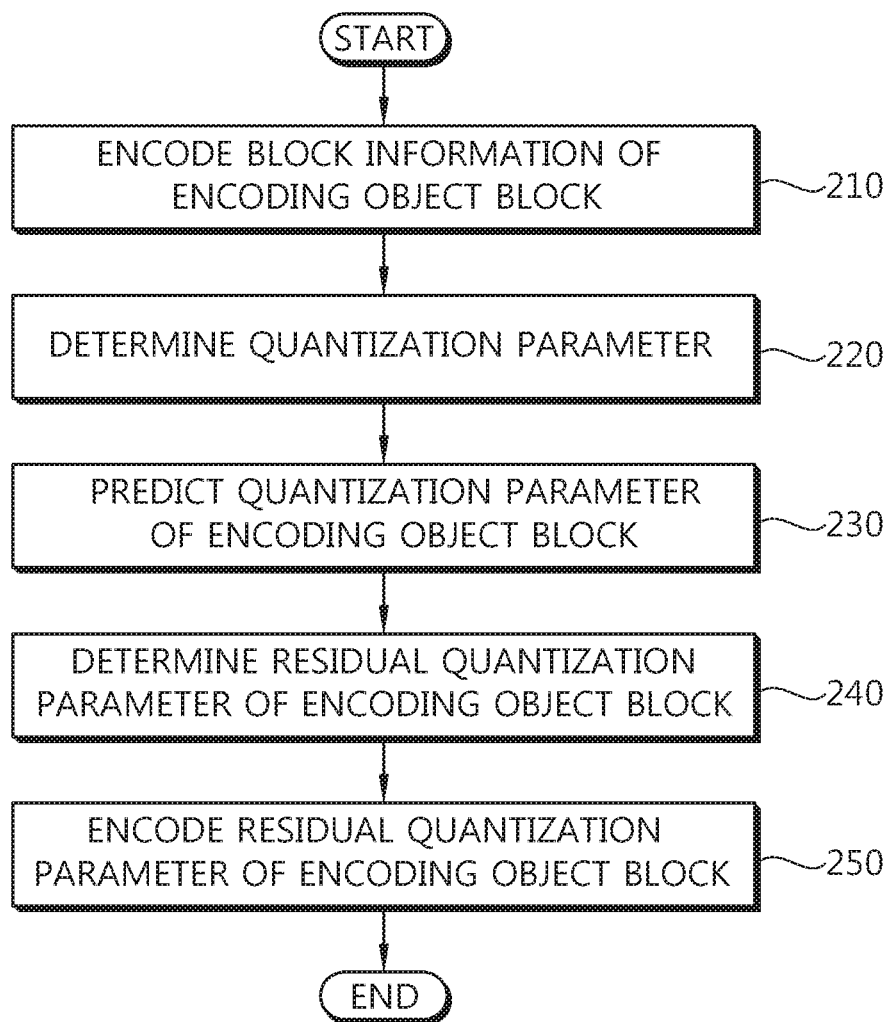
FIG. 2 is a flow chart provided in order to describe a method for encoding an image based on a residual quantization parameter according to an embodiment of the present invention.

FIG. 2 is a flow chart provided in order to describe a method for encoding an image based on a residual quantization parameter according to an embodiment of the present invention.

First, in operation (210), an apparatus for encoding an image may encode block information of an encoding object block. Here, when the apparatus for encoding an image and the apparatus for decoding an image previously knows the block information of the encoding object block or a bitstream is previously present, operation (210) may be omitted in FIG. 2.

Then, in operation (220), the apparatus for encoding an image may determine a quantization parameter of the encoding object block based on the block information of the encoding object block.

Here, a process of encoding the block information and a process of determining the quantization parameter are the same as the processes described in operations (110 and 120) of FIG. 1. Therefore, an overlapped description thereof will be omitted.

Next, in operation (230), the apparatus for encoding an image may predict a quantization parameter of an encoding object block.

As an example, the apparatus for encoding an image may predict the quantization parameter of the encoding object block using a quantization parameter that is previously encoded before the encoding object block in an encoding order.

As another example, the apparatus for encoding an image may predict the quantization parameter of the encoding object block using a quantization parameter of a block that is previously encoded before the encoding object block in the encoding order.

As another example, the apparatus for encoding an image may predict the quantization parameter of the encoding object block using a set of quantization parameters that are previously encoded before the encoding object block in the encoding order.

As another example, the apparatus for encoding an image may predict the quantization parameter of the encoding object block using a set of quantization parameters of a block that is previously encoded before the encoding object block in the encoding order.

As another example, the apparatus for encoding an image may predict the quantization parameter of the encoding object block using a quantization parameter that is previously encoded adjacent to the encoding object block.

As another example, the apparatus for encoding an image may predict the quantization parameter of the encoding object block using a set of quantization parameters that are previously encoded adjacent to the encoding object block.

As another example, the apparatus for encoding an image may predict the quantization parameter of the encoding object block using quantization parameters of the adjacent blocks that are previously encoded. Here, the adjacent blocks mean blocks positioned spatially adjacent to the encoding object block.

As another example, the apparatus for encoding an image may predict the quantization parameter of the encoding object block using a set of quantization parameters of adjacent blocks.

As another example, the apparatus for encoding an image may predict the quantization parameter of the encoding object block using quantization parameters of blocks that have a depth shallower than that of the encoding object block among blocks that are previously encoded.

As another example, the apparatus for encoding an image may predict the quantization parameter of the encoding object block using quantization parameters of blocks that have a size larger than that of the encoding object block among blocks that are previously encoded.

As another example, the apparatus for encoding an image may predict the quantization parameter of the encoding object block using a quantization parameter defined in the SPS, the PPS, or the slice header.

As another example, the apparatus for encoding an image may determine a block having the same spatial position as that of the encoding object block in a previously encoded slice or a previously encoded picture and predict the quantization parameter of the encoding object block using a quantization parameter of the determined block.

Figure 9:
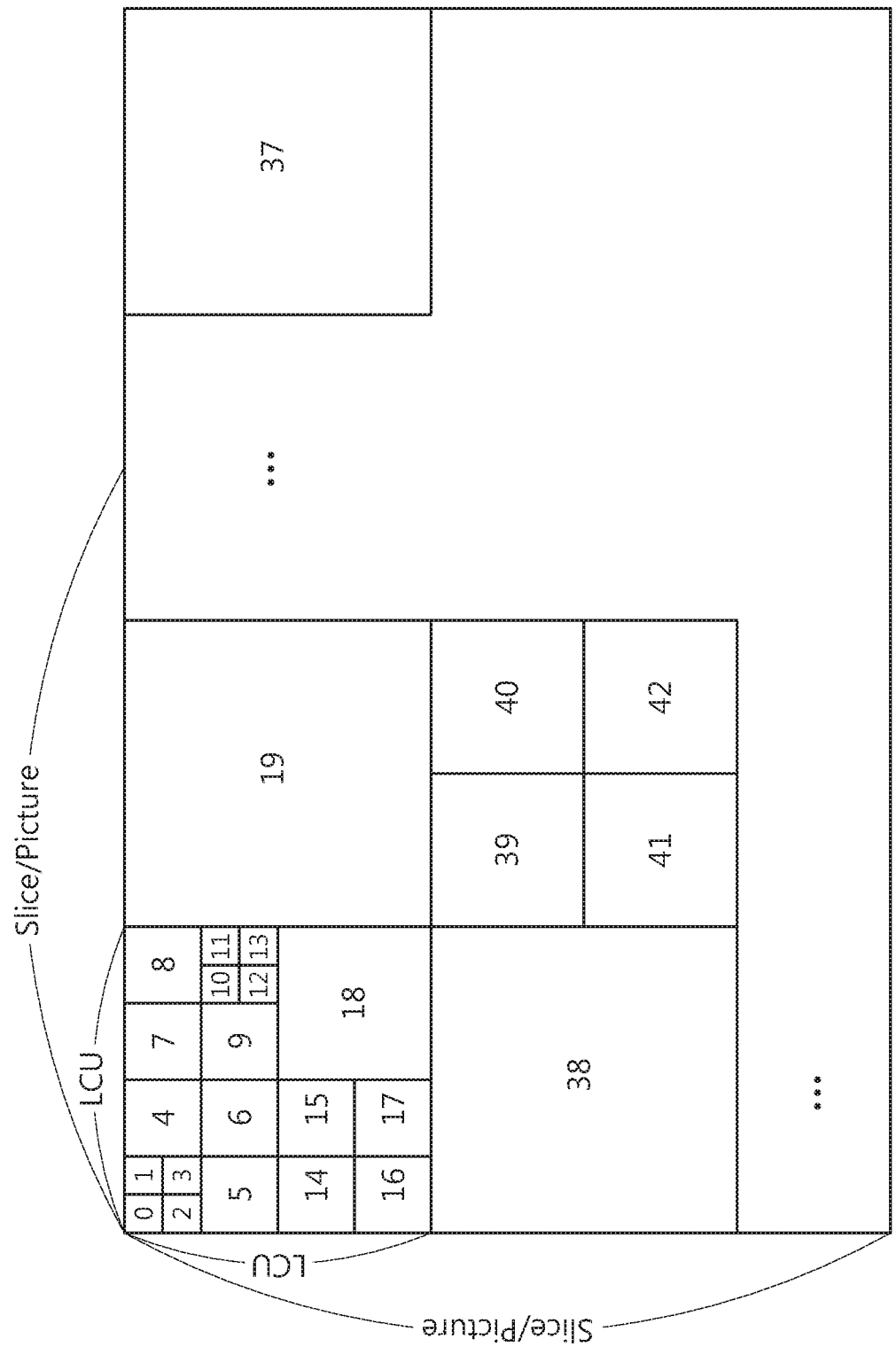
FIG. 9 shows a method for predicting a quantization parameter according to an embodiment of the present invention.

As another example, the apparatus for encoding an image may predict the quantization parameter of the encoding object block using at least one of quantization parameters of blocks that are encoded before the encoding object block in a Z scan order and quantization parameters of blocks that are present at the left based on the encoding object block and are previously encoded, as shown in FIG. 9.

Here, when a largest coding unit (LCU) quantization parameter is predicted, the quantization parameter of the encoding object block may be predicted from quantization parameters of blocks present in an LCU that is encoded before the encoding object block in an encoding order or a raster scan order or quantization parameters of blocks present in an LCU present at the left or the upper of the encoding object block.

Here, when a LCU quantization parameter is predicted, the quantization parameter of the encoding object block may be predicted using quantization parameters of blocks that are encoded before the encoding object block in a Z scan order or quantization parameters of adjacent blocks based on the encoding object block.

Here, when the LCU is present at the leftmost portion within a slice or a picture, the quantization parameter of the encoding object block may be predicted using one of a quantization parameter of the slice, a quantization parameter of the picture, quantization parameters of blocks present in an LCU that is encoded before the encoding object block in the encoding order or the raster scan order, and previously encoded quantization parameters of blocks previously present in the Z scan order.

Numerals in blocks of FIG. 9 indicate an order in which the quantization parameters are predicted. Within the LCU, the quantization parameter of the encoding object block may be predicted using the quantization parameters of the blocks that are encoded before the encoding object block in the Z scan order, and between the LCUs, the quantization parameter of the encoding object block may be predicted from the quantization parameters of the blocks present in the LCU that is encoded before the encoding object block in the encoding order or the raster scan order.

As another example, the apparatus for encoding an image may predict the quantization parameter of the encoding object block using quantization parameters of blocks that are previously encoded according to similarity of encoding parameters. Here, the encoding parameter may be a size of a block, a depth of transform, motion merge, a motion vector predictor, an intra prediction direction, a prediction mode, a motion vector, a reference picture index, a reference picture list, a coded block pattern, a coded block flag, or the like. When the encoding object block has a size of N X M, the quantization parameter may be predicted using blocks having a size of N X M among blocks adjacent to the encoding object block. When the encoding object block has a transform depth of N, the quantization parameter may be predicted using blocks having a transform depth of N among the blocks adjacent to the encoding object block. When motion merge is performed on the encoding object block, the quantization parameter may be predicted using blocks that become motion merge objects. When the encoding object block uses the motion vector predictor, the quantization parameter may be predicted using a block indicated by the corresponding motion vector predictor. When the encoding object block is intra encoded, the quantization parameter of the encoding object block may be predicted using quantization parameters of blocks encoded in the same intra prediction direction as or similar intra prediction direction to a corresponding intra prediction direction. When the encoding object block is intra encoded using restored pixels of upper blocks based on the encoding object block, the quantization parameter of the encoding object block may be predicted using quantization parameters of the upper blocks, and when the encoding object block is intra encoded using restored pixels of left blocks based on the encoding object block, the quantization parameter of the encoding object block may be predicted using quantization parameters of the left blocks. When the encoding object block is intra encoded, the quantization parameter of the encoding object block may be predicted using blocks used to encode an intra prediction mode (direction) of the encoding object block among the blocks adjacent to the encoding object block. For example, when an intra prediction mode of any one of the left blocks and the upper blocks based on the encoding object block is used in encoding the intra prediction mode of the encoding object block, the quantization parameter of the encoding object block may be predicted using quantization parameters of the used prediction unit. The quantization parameter of the encoding object block may be predicted using quantization parameters of blocks encoded in the same prediction mode as that of the encoding object block. For example, when the encoding object block is inter encoded, the quantization parameter of the encoding object block may be predicted using quantization parameters of blocks encoded in an inter prediction mode among blocks adjacent to the encoding object block, and when the encoding object block is intra encoded, the quantization parameter of the encoding object block may be predicted using quantization parameters of blocks encoded in the intra prediction mode among the blocks adjacent to the encoding object block. Here, in the presence of a plurality of blocks encoded in the same prediction mode as that of the encoding object block, quantization parameters of the plurality of blocks may be used to predict the quantization parameter of the encoding object block. When the encoding object block is inter encoded, the quantization parameter of the encoding object block may be predicted using quantization parameters of blocks within a reference picture indicated by motion information of the encoding object block using a motion vector, a reference picture index, and a reference picture list, which correspond to the motion information. Here, when the encoding object block has at least two motion information, the number of quantization parameters of blocks within the reference picture may be at least two. When a residual signal is not present in a block that is previously encoded and a coded block pattern or a coded block flag is thus 0, a quantization parameter of a corresponding block may not be used to predict the quantization parameter of the encoding object block. Here, the fact that the coded block pattern or the coded block flag is 0 means that residual signals of a luminance component and a chrominance component are not encoded or a residual signal of a luminance component is not encoded.

The quantization parameter of the encoding object block may be predicted using at least one of the methods for predicting the quantization parameter of the encoding object block or a combination thereof.

Next, in operation (240), the apparatus for encoding an image may determine a residual quantization parameter of the encoding object block.

Here, when the number of predicted quantization parameters of the encoding object block is plural, the apparatus for encoding an image may determine the residual quantization parameter of the encoding object block by calculating the average of the predicted quantization parameters of the encoding object block and subtracting the calculated average from the quantization parameter of the encoding object block.

In addition, the apparatus for encoding an image may determine the residual quantization parameter of the encoding object block through a difference between the quantization parameter of the encoding object block and the predicted quantization parameters of the encoding object block.

As an example, when a quantization parameter of a block that is previously encoded in an encoding order is used as the predicted quantization parameter, the apparatus for encoding an image may determine the residual quantization parameter (unit_qp_delta) of the encoding object block by subtracting the quantization parameter (qp_prev_unit) of the block that is previously encoded in the encoding order from the quantization parameter (qp_curr_unit) of the encoding object block.

As another example, when a set of quantization parameters of a block that is previously encoded in the encoding order is used as the predicted quantization parameter, the apparatus for encoding an image may determine the residual quantization parameter (unit_qp_delta) of the encoding object block by subtracting any one of quantization parameters configuring the set (qp_prev_unit_1, qp_prev_unit_2, qp_prev_unit_3) of quantization parameters of the block that is previously encoded in the encoding order from the quantization parameter (qp_curr_unit) of the encoding object block. Here, qp_prev_unit_1 may be a quantization parameter of a block that is encoded before the encoding object block by one block in the encoding order, qp_prev_unit_2 may be a quantization parameter of a block that is encoded before the encoding object block by two blocks in the encoding order, and qp_prev_unit_3 may be a quantization parameter of a block that is encoded before the encoding object block by three blocks in the encoding order. Here, the apparatus for encoding an image may transmit quantization parameter identification information indicating what quantization parameter (that is, a predicted quantization parameter) among the quantization parameters configuring the set of quantization parameters was used to determine the residual quantization parameter to the apparatus for decoding an image.

As another example, when a quantization parameter of a block that is previously encoded at an upper of the encoding object block is used as the predicted quantization parameter, the apparatus for encoding an image may determine the residual quantization parameter (unit_qp_delta) of the encoding object block by subtracting the quantization parameter (qp_prev_unit) of the block that is previously encoded at an upper of the encoding object block from the quantization parameter (qp_curr_unit) of the encoding object block.

As another example, when a set of quantization parameters of adjacent blocks that are previously encoded is used, the apparatus for encoding an image may determine the residual quantization parameter (unit_qp_delta) of the encoding object block by subtracting a single quantization parameter in the set (qp_prev_unit_1, qp_prev_unit_2, qp_prev_unit_3) of quantization parameters of the adjacent blocks that are previously encoded from the quantization parameter (qp_curr_unit) of the encoding object block. Here, qp_prev_unit_1 may be a quantization parameter of an encoding block at the left of the encoding object block, qp_prev_unit_2 may be a quantization parameter of an encoding block at the upper of the encoding object block, and qp_prev_unit_3 may be a quantization parameter of an encoding block at the left upper of the encoding object block. Here, the apparatus for encoding an image may transmit quantization parameter identification information indicating what quantization parameter (that is, a predicted quantization parameter) among the quantization parameters configuring the set of quantization parameters was used to determine the residual quantization parameter to the apparatus for decoding an image.

As another example, when a set of quantization parameters of adjacent blocks that are previously encoded is used, the apparatus for encoding an image may determine the residual quantization parameter (unit_qp_delta) of the encoding object block by subtracting a single quantization parameter in the set (qp prey unit 1, qp prey unit 2, qp_prev_unit_3) of quantization parameters of the adjacent blocks that are previously encoded from the quantization parameter (qp_curr_unit) of the encoding object block. Here, when the single quantization parameter is selected in the set of quantization parameters, a quantization parameter having a median value in the set of quantization parameters may be selected. Here, qp_prev_unit_1 may be a quantization parameter of an encoding block at the left of the encoding object block, qp_prev_unit_2 may be a quantization parameter of an encoding block at the upper of the encoding object block, and qp_prev_unit_3 may be a quantization parameter of an encoding block at the right upper of the encoding object block.

As another example, when a quantization parameter of a block that has a depth shallower than that of the encoding object block and is previously encoded among the predicted quantization parameters of the encoding object block is used, the apparatus for encoding an image may determine the residual quantization parameter (unit_qp_delta) of the encoding object block by subtracting the quantization parameter (qp_prev_unit) of the block that has a depth shallower than that of the encoding object block and is previously encoded from the quantization parameter (qp_curr_unit) of the encoding object block.

As another example, when a quantization parameter of a block that has a size larger than that of the encoding object block and is previously encoded among the predicted quantization parameters of the encoding object block is used, the apparatus for encoding an image may determine the residual quantization parameter (unit_qp_delta) of the encoding object block by subtracting the quantization parameter (qp_prev_unit) of the block that has a size larger than that of the encoding object block and is previously encoded from the quantization parameter (qp_curr_unit) of the encoding object block.

As another example, the apparatus for encoding an image may determine the residual quantization parameter (unit_qp_ delta) of the encoding object block by subtracting a quantization parameter (slice_qp_delta) defined in a slice header from the quantization parameter (qp_curr_unit) of the encoding object block.

As another example, in the presence of a quantization parameter (qp_left_unit) in a block present at the left of the encoding object block, the apparatus for encoding an image may determine the residual quantization parameter (unit_qp_ delta) of the encoding object block by subtracting the quantization parameter (qp_left_unit) of the block present at the left from the quantization parameter (qp_curr_unit) of the encoding object block. Here, in the absence of the block at the left of the encoding object block or in the absence of a quantization parameter (qp_left_unit) in the block present at the left of the encoding object block, the apparatus for encoding an image may determine the residual quantization parameter (unit_qp_delta) of the encoding object block by subtracting the quantization parameter (qp_prevs_unit) of the block that is previously encoded in the encoding order from the quantization parameter (qp_curr_unit) of the encoding object block.

The residual quantization parameter of the encoding object block may be determined using at least one of the methods for determining the residual quantization parameter of the encoding object block or a combination thereof.

Then, in operation (250), the apparatus for encoding an image may encode the determined residual quantization parameter of the encoding object block.

As an example, the apparatus for encoding an image may entropy-encode the residual quantization parameter of the encoding object block to thereby generate a bitstream. Here, when the apparatus for encoding an image and the apparatus for decoding an image previously knows the residual quantization parameter of the encoding object block, operation (250) may be omitted in FIG. 2.

As another example, the apparatus for encoding an image may encode the residual quantization parameter of the encoding object block by various methods for encoding the quantization parameter of the encoding object block in operation (130) of FIG. 1. In other words, the apparatus for encoding an image may encode the residual quantization parameter of the encoding object block using any one of the above-mentioned methods 1) to 14). For example, in the case of using the method 1) or 2), the apparatus for encoding an image may encode a single residual quantization parameter per the LCTB or the SCTB. A process of encoding the residual quantization parameter of the encoding object block using any one of the methods 3) to 14) is overlapped with the process of determining the quantization parameter in operation (130). Therefore, a detailed description thereof will be omitted. In addition, the apparatus for encoding an image may encode the residual quantization parameter of the encoding object block using a combination of at least one of the methods for encoding the residual quantization parameter of the encoding object block.

When the residual quantization parameter of the encoding object block is encoded, in the presence of a block having a depth deeper than a specific depth of the block in which the residual quantization parameter is encoded, the apparatus for encoding an image may omit the encoding of the residual quantization parameter of the block having the deeper depth. In addition, in the presence of a block having a size smaller than a specific size of the block in which the residual quantization parameter is encoded, the apparatus for encoding an image may omit the encoding of the residual quantization parameter of the block having the smaller size.

Figure 3:
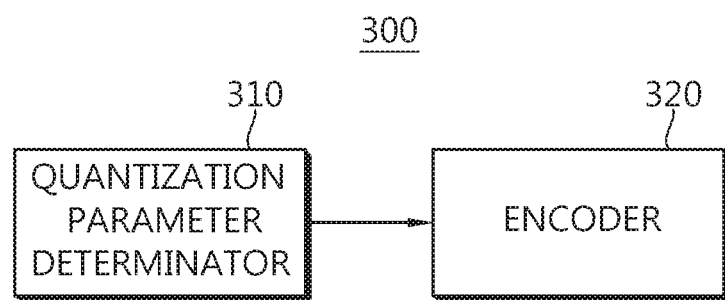
FIG. 3 is a block diagram showing a configuration of an apparatus for encoding an image according to an embodiment of the present invention.

FIG. 3 is a block diagram showing a configuration of an apparatus for encoding an image according to an embodiment of the present invention.

As shown in FIG. 3, an apparatus 300 for encoding an image may include a quantization parameter determinator 310 and an encoder 320.

The quantization parameter determinator 310 may determine a quantization parameter of an encoding object block based on block information of the encoding object block. Here, the block information may include at least one of a type of a block such as a prediction unit, a transform unit, or the like, a size of the block, a depth of the block, and an encoding/decoding order of the block. Here, a process of determining the quantization parameter of the encoding object block according to the block information has been described in detail in operations (110 and 120) of FIG. 1. Therefore, an overlapped description thereof will be omitted.

The encoder 320 may entropy-encode at least one of the block information of the encoding object block and the determined quantization parameter of the encoding object block to thereby generate a bitstream.

As an example, the encoder 320 may entropy-encode the block information of the encoding object block in any one of a sequence parameter set (SPS), a picture parameter set (PPS), and a slice header in a configuration of the bitstream. In addition, the encoder 320 may encode the quantization parameter of the encoding object block using any one of the methods 1) to 14) described in FIG. 1. Further, the encoder 320 may encode the quantization parameter of the encoding object block using a combination of at least one of the methods for encoding the quantization parameter of the encoding object block. Here, an operation of encoding the quantization parameter of the encoding object block has been described in detail in operation (130) of FIG. 1. Therefore, an overlapped description thereof will be omitted.

When the quantization parameter of the encoding object block is encoded, in the presence of a block having a depth deeper than a specific depth of the block in which the quantization parameter is encoded, the apparatus for encoding an image may omit the encoding of the quantization parameter of the block having the deeper depth. In addition, in the presence of a block having a size smaller than a specific size of the block in which the quantization parameter is encoded, the apparatus for encoding an image may omit the encoding of the quantization parameter of the block having the smaller size.

Here, when the apparatus for encoding an image and the apparatus for decoding an image previously knows the block information of the encoding object block, the encoder 320 may omit the process of entropy-encoding the block information of the encoding object block. Likewise, when the apparatus for encoding an image and the apparatus for decoding an image previously knows the quantization parameter of the encoding object block, the encoder 320 may omit the operation of entropy-encoding the quantization parameter of the encoding object block to thereby generate the bitstream.

Figure 4:
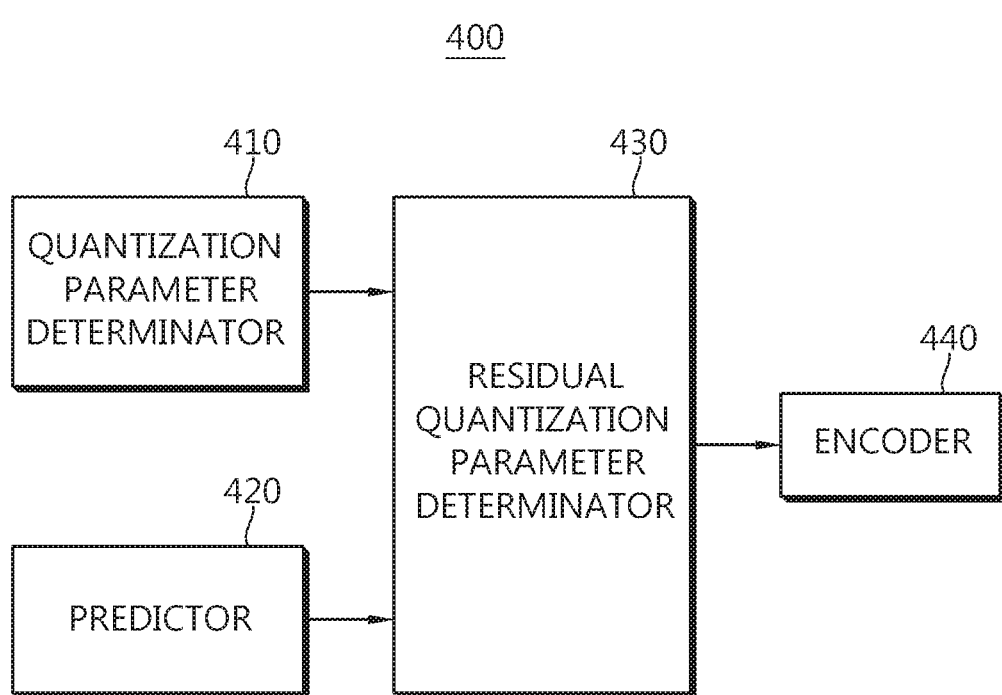
FIG. 4 is a block diagram showing a configuration of an apparatus for encoding an image determining a residual quantization parameter according to an embodiment of the present invention.

FIG. 4 is a block diagram showing a configuration of an apparatus for encoding an image determining a residual quantization parameter according to an embodiment of the present invention.

As shown in FIG. 4, an apparatus 400 for encoding an image may include a quantization parameter determinator 410, a predictor 420, a residual quantization parameter determinator 430, and an encoder 440. In FIG. 4, operations of the quantization parameter determinator 410 and the encoder 440 are the same as those of the quantization parameter determinator 310 and the encoder 320 of FIG. 3. Therefore, an overlapped description thereof will be omitted.

The predictor 420 may predict a quantization parameter of an encoding object block.

For example, the predictor 420 may predict the quantization parameter of the encoding object block using any one of a quantization parameter that is previously encoded before the encoding object block in an encoding order, a quantization parameter of a block that is previously encoded before the encoding object block in the encoding order, a set of quantization parameters that are previously encoded before the encoding object block in the encoding order, a set of quantization parameters of a block that is previously encoded before the encoding object block in the encoding order, a quantization parameter that is previously encoded adjacent to the encoding object block, a set of quantization parameters that are previously encoded adjacent to the encoding object block, and a set of quantization parameters of adjacent blocks.

As another example, the predictor 420 may predict the quantization parameter of the encoding object block using quantization parameters of blocks that have a depth shallower than that of the encoding object block among blocks that are previously encoded.

As another example, the predictor 420 may predict the quantization parameter of the encoding object block using quantization parameters of blocks that have a size larger than that of the encoding object block among blocks that are previously encoded.

As another example, the predictor 420 may predict the quantization parameter of the encoding object block using a quantization parameter defined in the SPS, the PPS, or the slice header.

As another example, the predictor 420 may determine a block having the same spatial position as that of the encoding object block in a previously encoded slice or a previously encoded picture and predict the quantization parameter of the encoding object block using a quantization parameter of the determined block.

As another example, the predictor 420 may predict the quantization parameter of the encoding object block using at least one of quantization parameters of blocks that are encoded before the encoding object block in a Z scan order and quantization parameters of blocks that are present at the left based on the encoding object block and are previously encoded, as shown in FIG. 9.

Here, when a largest coding unit (LCU) quantization parameter is predicted, the quantization parameter of the encoding object block may be predicted from quantization parameters of blocks present in an LCU that is encoded before the encoding object block in an encoding order or a raster scan order or quantization parameters of blocks present in an LCU present at the left or the upper of the encoding object block.

Here, when a LCU quantization parameter is predicted, the quantization parameter of the encoding object block may be predicted using quantization parameters of blocks that are encoded before the encoding object block in a Z scan order or quantization parameters of adjacent blocks based on the encoding object block.

Here, when the LCU present at the leftmost portion within a slice or a picture, the quantization parameter of the encoding object block may be predicted using one of a quantization parameter of the slice, a quantization parameter of the picture, quantization parameters of blocks present in an LCU that is encoded before the encoding object block in the encoding order or the raster scan order, and previously encoded quantization parameters of blocks previously present in the Z scan order.

Numerals in blocks of FIG. 9 indicate an order in which the quantization parameters are predicted. Within the LCU, the quantization parameter of the encoding object block may be predicted using the quantization parameters of the blocks that are encoded before the encoding object block in the Z scan order, and between the LCUs, the quantization parameter of the encoding object block may be predicted from the quantization parameters of the blocks present in the LCU that is encoded before the encoding object block in the encoding order or the raster scan order.

As another example, the predictor 420 may predict the quantization parameter of the encoding object block using quantization parameters of blocks that are previously encoded according to similarity of encoding parameters. Here, the encoding parameter may be a size of a block, a depth of transform, motion merge, a motion vector predictor, an intra prediction direction, a prediction mode, a motion vector, a reference picture index, a reference picture list, a coded block pattern, a coded block flag, or the like. When the encoding object block has a size of N×M, the quantization parameter may be predicted using blocks having a size of N×M among blocks adjacent to the encoding object block. When the encoding object block has a transform depth of N, the quantization parameter may be predicted using blocks having a transform depth of N among the blocks adjacent to the encoding object block. When motion merge is performed on the encoding object block, the quantization parameter may be predicted using blocks that become motion merge objects. When the encoding object block uses the motion vector predictor, the quantization parameter may be predicted using a block indicated by the corresponding motion vector predictor. When the encoding object block is intra encoded, the quantization parameter of the encoding object block may be predicted using quantization parameters of blocks encoded in the same intra prediction direction as or similar intra prediction direction to a corresponding intra prediction direction. When the encoding object block is intra encoded using restored pixels of upper blocks based on the encoding object block, the quantization parameter of the encoding object block may be predicted using quantization parameters of the upper blocks, and when the encoding object block is intra encoded using restored pixels of left blocks based on the encoding object block, the quantization parameter of the encoding object block may be predicted using quantization parameters of the left blocks. When the encoding object block is intra encoded, the quantization parameter of the encoding object block may be predicted using blocks used to encode an intra prediction mode (direction) of the encoding object block among the blocks adjacent to the encoding object block. For example, when an intra prediction mode of any one of the left blocks and the upper blocks based on the encoding object block is used in encoding the intra prediction mode of the encoding object block, the quantization parameter of the encoding object block may be predicted using quantization parameters of the used prediction block. The quantization parameter of the encoding object block may be predicted using quantization parameters of blocks encoded in the same prediction mode as that of the encoding object block. For example, when the encoding object block is inter encoded, the quantization parameter of the encoding object block may be predicted using quantization parameters of blocks encoded in an inter prediction mode among blocks adjacent to the encoding object block, and when the encoding object block is intra encoded, the quantization parameter of the encoding object block may be predicted using quantization parameters of blocks encoded in the intra prediction mode among the blocks adjacent to the encoding object block. Here, in the presence of a plurality of blocks encoded in the same prediction mode as that of the encoding object block, quantization parameters of the plurality of blocks may be used to predict the quantization parameter of the encoding object block. When the encoding object block is inter encoded, the quantization parameter of the encoding object block may be predicted using quantization parameters of blocks within a reference picture indicated by motion information of the encoding object block using a motion vector, a reference picture index, and a reference picture list, which correspond to the motion information. Here, when the encoding object block has at least two motion information, the number of quantization parameters of blocks within the reference picture may be at least two. When a residual signal is not present in a block that is previously encoded and a coded block pattern or a coded block flag is thus 0, a quantization parameter of a corresponding block may not be used to predict the quantization parameter of the encoding object block. Here, the fact that the coded block pattern or the coded block flag is 0 means that residual signals of a luminance component and a chrominance component are not encoded or a residual signal of a luminance component is not encoded.

The quantization parameter of the encoding object block may be predicted using at least one of the methods for predicting the quantization parameter of the encoding object block or a combination thereof.

The residual quantization parameter determinator 430 may determine a residual quantization parameter of the encoding object block using the quantization parameter of the encoding object block and the predicted quantization parameter of the encoding object block.

As an example, the residual quantization parameter determinator 430 may determine the residual quantization parameter of the encoding object block by subtracting the predicted quantization parameter of the encoding object block from the quantization parameter of the encoding object block.

As another example, the residual quantization parameter determinator 430 may calculate the average of the predicted quantization parameters of the encoding object block. In addition, the residual quantization parameter determinator 430 may determine the residual quantization parameter of the encoding object block by subtracting the average of the predicted quantization parameters of the encoding object block from the quantization parameter of the encoding object block.

The residual quantization parameter of the encoding object block may be determined using at least one of the methods for determining the residual quantization parameter of the encoding object block or a combination thereof.

Meanwhile, the encoder 440 may encode at least one of the residual quantization parameter of the encoding object block and the block information of the encoding object block.

As an example, the encoder 440 may entropy-encode the residual quantization parameter of the encoding object block and the block information of the encoding object block to thereby generate a bitstream. Here, when the apparatus for encoding an image and the apparatus for decoding an image previously know the block information of the encoding object block, the encoder 440 may entropy-encode only the residual quantization parameter of the encoding object block to thereby generate the bitstream.

As an example, the encoder 440 may entropy-encode the block information of the encoding object block in any one of a sequence parameter set (SPS), a picture parameter set (PPS), and a slice header in a configuration of the bitstream. In addition, the encoder 440 may encode the residual quantization parameter of the encoding object block using any one of the methods 1) to 14) described in FIG. 1. In addition, the apparatus for encoding an image may encode the residual quantization parameter of the encoding object block using a combination of at least one of the methods for encoding the residual quantization parameter of the encoding object block.

When the residual quantization parameter of the encoding object block is encoded, in the presence of a block having a depth deeper than a specific depth of the block in which the residual quantization parameter is encoded, the apparatus for encoding an image may omit the encoding of the residual quantization parameter of the block having the deeper depth. In addition, in the presence of a block having a size smaller than a specific size of the block in which the residual quantization parameter is encoded, the apparatus for encoding an image may omit the encoding of the residual quantization parameter of the block having the smaller size.

Figure 5:
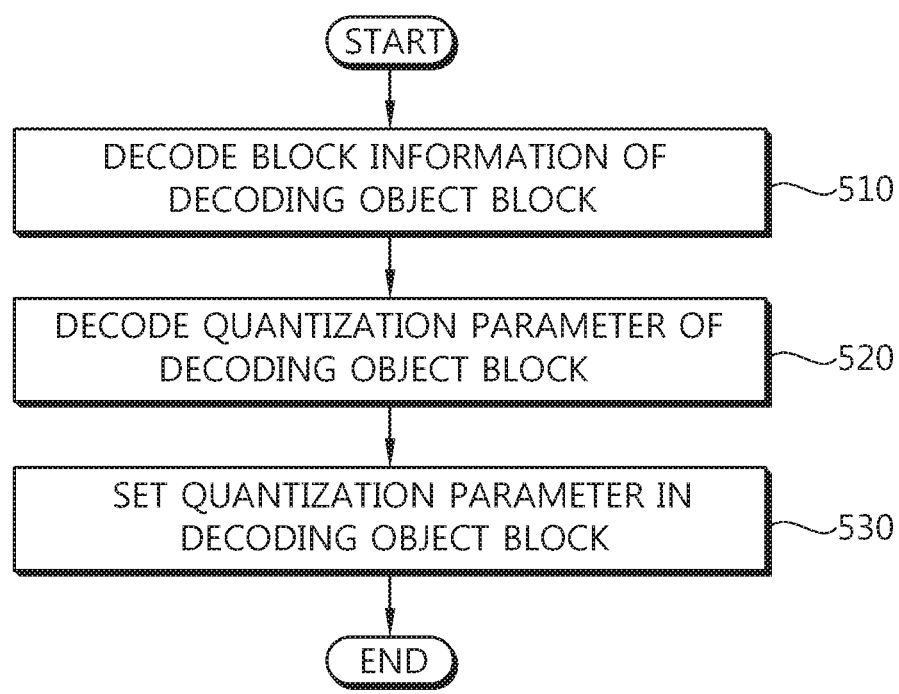
FIG. 5 is a flow chart provided in order to describe a method for decoding an image according to an embodiment of the present invention.

FIG. 5 is a flow chart provided in order to describe a method for decoding an image according to an embodiment of the present invention.

First, in operation (510), an apparatus for decoding an image may decode block information of a decoding object block.

For example, the apparatus for decoding an image may demultiplex the bitstream received from the apparatus for encoding an image to thereby extract the encoded block information of the decoding object block. In addition, the apparatus for decoding an image may entropy-decode the encoded block information of the decoding object block. Here, the encoded block information of the decoding object block included in the bitstream is the same as the block information of the encoding object block encoded in the apparatus for encoding an image.

As another example, the apparatus for decoding an image may entropy-decode the block information of the decoding object block included in any one of a sequence parameter set (SPS), a picture parameter set (PPS), and a slice header in a configuration of the bitstream.

More specifically, the apparatus for decoding an image may entropy-decode the block information such as max_coding_unit_width indicating a maximum width in a size of a coding unit, max_coding_unit_width indicating a maximum width in a size of a coding unit, max_coding_unit_height indicating a maximum height in the size of the coding unit, max_coding_unit_hierarchy_depth indicating a maximum hierarchy depth of the coding unit, log2_min_coding_unit_size_minus3 indicating a minimum size of the coding unit, log2_min_transform_unit_size_minus2 indicating a minimum size of a transform unit, max_transform_unit_hierarchy_depth indicating a maximum hierarchy depth of the transform unit, log2_diff_max_min_coding_block_size indicating a difference between minimum and maximum sizes of the coding unit, log2_diff_max_min_transform_block_size indicating a difference between minimum and maximum sizes of the transform unit, max_transform_hierarchy_depth_inter indicating a maximum depth of an inter encoded transform unit, max_transform_hierarchy_depth_intra indicating a maximum depth of an intra encoded transform unit, and the like, which correspond to information of the blocks encoded in the SPS, the PPS, or the slice header.

As another example, when the apparatus for decoding an image previously knows the block information of the decoding object block, it may omit the process of entropy-decoding the block information of the decoding object block from the bitstream. That is, when the apparatus for decoding an image previously knows the block information of the decoding object block, operation (510) may be omitted in FIG. 5. For example, when the apparatus for decoding an image previously knows information associated with sizes of blocks such as a height, a width, and the like, of a coding unit, a prediction unit, or a transform unit, it may not entropy-decode the block information of the decoding object block from the bitstream.

The block information of the decoding object block may be decoded using at least one of the methods for decoding the block information of the decoding object block or a combination thereof.

Then, in operation (520), the apparatus for decoding an image may decode a quantization parameter of the decoding object block from the bitstream based on the block information of the decoding object block.

As an example, when the apparatus for decoding an image does not previously know the quantization parameter of the decoding object block, it may entropy-decode the quantization parameter of the decoding object block from the bitstream. Here, when the apparatus for decoding an image previously knows the quantization parameter of the decoding object block, it may omit the operation of entropy-decoding the quantization parameter of the decoding object block.

Hereinafter, a process of decoding a quantization parameter of a decoding object block based on block information of a decoding object block will be described in more detail by way of example.

1) First, the apparatus for decoding an image may decode a single quantization parameter per LCTB, LCU, SCTB, or SCU.

2) In addition, the apparatus for decoding an image may decode a single quantization parameter per a prediction unit regardless of a size or a depth of the prediction unit.

3) In addition, the apparatus for decoding an image may decode a single quantization parameter per a transform unit regardless of a size or a depth of the transform unit.

4) In addition, the apparatus for decoding an image may decode a single quantization parameter at a specific depth or a specific size of the coding unit, at a specific depth or a specific size of the prediction unit, or at a specific depth or a specific size of the transform unit. A more detailed configuration will be described below with reference to Table 1, Table 2, Table 3, Table 4, Table 6, Table 7, Table 8, Table 9, Table 10, Table 11, Table 12, Table 13, and Table 14.

5) In addition, the apparatus for decoding an image may decode a quantization parameter based on block information of a decoding object block defined in a PPS, a SPS, or a slice header.

6) In addition, the apparatus for decoding an image may decode a quantization parameter of a decoding object block based on whether or not a residual signal to be decoded included in the decoding object block is present.

7) In addition, the apparatus for decoding an image may decode a quantization parameter of a decoding object block using an equation or a value derived based on block information of the decoding object block.

8) In addition, the apparatus for decoding an image may decode a single quantization parameter using any one of a size of a transform unit (log2_min_transform_unit_size_minus2), a depth of the transform unit (max_transform_unit_hierarchy_depth), log2_diff_max_min_coding_block_size indicating a difference between minimum and maximum sizes of a coding unit, log2_min_transform_block_size_minus2 indicating a minimum size of the transform unit (a transform block), log2_diff_max_min_transform_block_size indicating a difference between minimum and maximum sizes of the transform unit, max_transform_hierarchy_depth_inter indicating a maximum depth of an inter encoded transform unit, and max_transform_hierarchy_depth_intra indicating a maximum depth of an intra encoded transform unit that are defined in the SPS, PPS, or the slice header.

9) In addition, the apparatus for decoding an image may decode a single quantization parameter using any one of a size of a coding unit (log2_min_coding_unit_size_minus3), a depth of the coding unit (max_coding_unit_hierarchy_depth), log2_diff_max_min_coding_block_size indicating a difference between minimum and maximum sizes of the coding unit, log2_min_transform_block_size_minus2 indicating a minimum size of the transform unit (a transform block), log2_diff_max_min_transform_block_size indicating a difference between minimum and maximum sizes of the transform unit, max_transform_hierarchy_depth_inter indicating a maximum depth of an inter encoded transform unit, and max_transform_hierarchy_depth_intra indicating a maximum depth of an intra encoded transform unit that are defined in the SPS, PPS, or the slice header.

10) In addition, the apparatus for decoding an image may decode a quantization parameter of a decoding object block within a sequence, within a picture, within a slice, within a LCTB, or the like. Here, the apparatus for decoding an image may determine and change the quantization parameter only in a corresponding unit using quantization parameter changeable information representing a change unit. For example, the apparatus for decoding an image may decode a syntax element associated with the quantization parameter changeable information. In addition, when a logical value of the decoded syntax element is 1, the apparatus for decoding an image may change the quantization parameter in a unit (a slice, a coding unit (CU), a prediction unit (PU), a transform unit (TU), and the like) lower than a picture and set the quantization parameter in the decoding object block according to the changed value. In addition, when the logical value of the decoded syntax element is 0, the apparatus for decoding an image may not change the quantization parameter in the unit lower than the picture.

11) In addition, when the apparatus for decoding an image determines the quantization parameter of the decoding object block using the above-mentioned methods 1) to 10), it may decode a syntax element representing information of the quantization parameter together with a size or a depth of a block from the PPS, the SPS, or the slice header. When the apparatus for decoding an image decodes the quantization parameter of the decoding object block using an equation or a value derived based on the block information, a size of a depth of the transform unit, or a size or a depth of the prediction unit, it may decode the syntax element representing the information of the quantization parameter together with the size or the depth of the block from the PPS, the SPS, or the slice header. Further, the apparatus for decoding an image may decode the quantization parameter only up to at a specific depth or a specific size of the block according to depths or sizes of each of the coding unit, the prediction unit, and the transform unit based on the block information of the decoding object block. Here, in the presence of a block having a depth deeper than a specific depth of the block in which the quantization parameter is decoded, the apparatus for decoding an image may set a quantization parameter of the block having the deeper depth so as to be the same as the quantization parameter set at the specific depth. In addition, qp_hierarchy_depth or log2_qp_unit_size may be individually applied to each of the coding unit, the prediction unit, and the transform unit. Here, qp_hierarchy_depth indicates a syntax element representing a specific depth of the block in which the quantization parameter is set, and log2_qp_unit_size indicates a syntax element representing a specific size of the block in which the quantization parameter is set. A more detailed configuration will be described below with reference to Table 1, Table 2, Table 3, Table 4, Table 6, Table 7, Table 8, Table 9, Table 10, Table 11, Table 12, Table 13, and Table 14.

The quantization parameter of the decoding object block may be decoded by at least one of the methods for decoding the quantization parameter of the decoding object block or a combination thereof.

When the quantization parameter of the decoding object block is decoded, in the presence of a block having a depth deeper than a specific depth of the block in which the quantization parameter is decoded, the apparatus for decoding an image may omit the decoding of the quantization parameter of the block having the deeper depth. In addition, in the presence of a block having a size smaller than a specific size of the block in which the quantization parameter is decoded, the apparatus for decoding an image may omit the decoding of the quantization parameter of the block having the smaller size.

Again, in operation (530), the apparatus for decoding an image may set the quantization parameter in the decoding object block as the quantization parameter of the decoding object block is decoded.

Here, the apparatus for decoding an image may set the quantization parameter in the decoding object block using the methods 1) to 11) described in operation (520). For example, in the case of using the method 1) or 2), the apparatus for decoding an image may set a single quantization parameter per the LCTB or the SCTB. The apparatus for decoding an image may set the quantization parameter in the decoding object block using any one of the methods 3) to 11) in the same scheme. Further, the apparatus for decoding an image may set the quantization parameter in the decoding object block using a combination of at least one of the methods for setting the quantization parameter of the decoding object block.

When the quantization parameter of the decoding object block is set, in the presence of a block having a depth deeper than a specific depth of the block in which the quantization parameter is set, the apparatus for decoding an image may set the quantization parameter of the block having the deeper depth so as to be the same as the quantization parameter set at the specific depth. In addition, in the presence of a block having a size smaller than a specific size of the block in which the quantization parameter is set, the apparatus for decoding an image may set a quantization parameter of the block having the smaller size so as to be the same as the quantization parameter set at the specific size.

Figure 6:
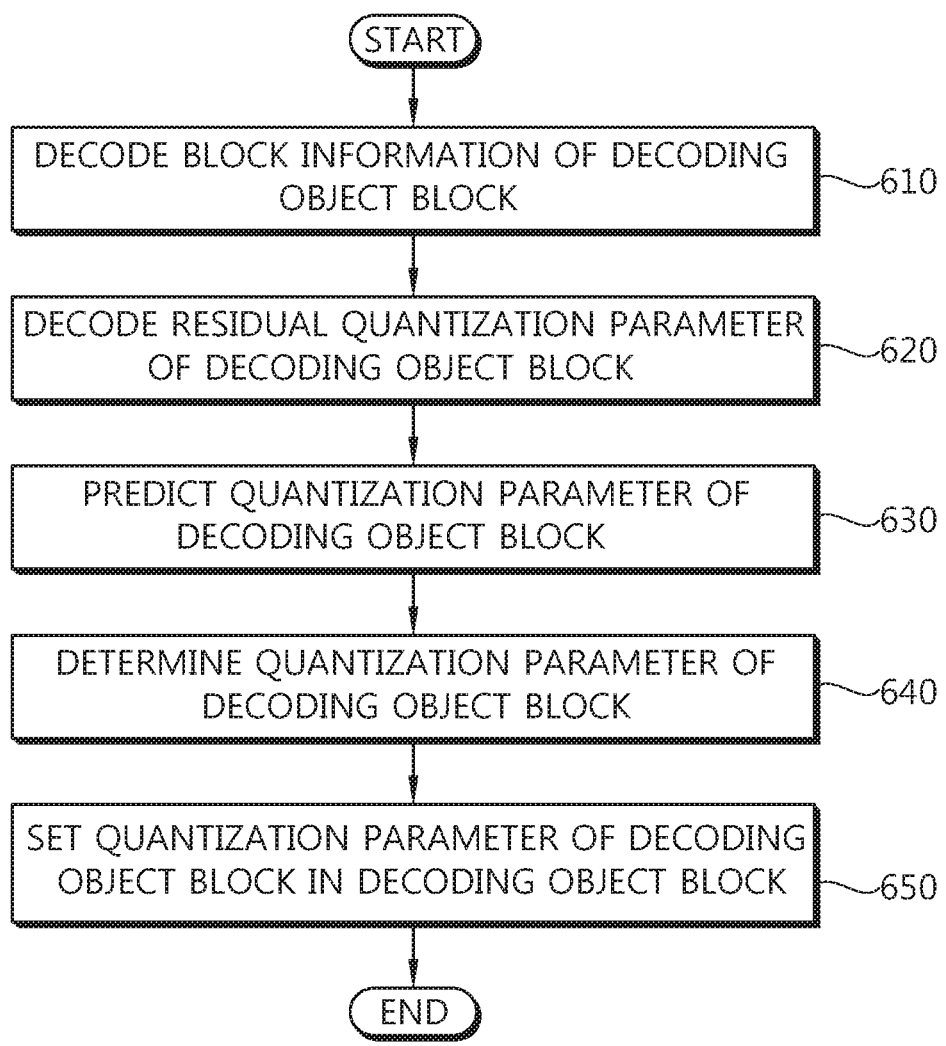
FIG. 6 is a flow chart provided in order to describe a method for decoding an image based on a residual quantization parameter according to an embodiment of the present invention.

FIG. 6 is a flow chart provided in order to describe a method for decoding an image based on a residual quantization parameter according to an embodiment of the present invention.

First, in operation (610), an apparatus for decoding an image may decode block information of a decoding object block. Here, a process of operation (610) is the same as that of operation (510) described above in FIG. 5. Therefore, an overlapped description thereof will be omitted.

Next, in operation (620), the apparatus for decoding an image may decode a residual quantization parameter of the decoding object block from a bitstream.

As an example, the apparatus for decoding an image may demultiplex the bitstream to thereby extract the encoded residual quantization parameter of the decoding object block. In addition, the apparatus for decoding an image may entropy-decode the encoded residual quantization parameter of the decoding object block. Here, when the apparatus for decoding an image previously knows the quantization parameter of the decoding object block, it may omit the process of entropy-decoding the encoded residual quantization parameter of the decoding object block.

As another example, the apparatus for decoding an image may decode the residual quantization parameter using any one of the methods 1) to 11) described in operation (520) of FIG. 5. Here, in the case of using the method 6), the apparatus for decoding an image may not decode the residual quantization parameter of the decoding object block since a residual signal to be decoded is not present within the decoding object block. In addition, the apparatus for decoding an image may decode the residual quantization parameter of the decoding object block using a combination of at least one of the methods for decoding the residual quantization parameter of the decoding object block.

When the residual quantization parameter of the decoding object block is decoded, in the presence of a block having a depth deeper than a specific depth of the block in which the residual quantization parameter is decoded, the apparatus for decoding an image may omit the decoding of the residual quantization parameter of the block having the deeper depth. In addition, in the presence of a block having a size smaller than a specific size of the block in which the residual quantization parameter is decoded, the apparatus for decoding an image may omit the decoding of the residual quantization parameter of the block having the smaller size.

Next, in operation (630), the apparatus for decoding an image may predict a quantization parameter of the decoding object block.

As an example, the apparatus for decoding an image may predict the quantization parameter of the decoding object block using any one of a quantization parameter that is previously decoded before the decoding object block in a decoding order, a quantization parameter of a block that is previously decoded before the decoding object block in the decoding order, a set of quantization parameters that are previously decoded before the decoding object block in the decoding order, and a quantization parameter of a block that is previously decoded before the decoding object block in the decoding order.

As another example, the apparatus for decoding an image may predict the quantization parameter of the decoding object block using any one of a quantization parameter that is previously decoded adjacent to the decoding object block, a set of quantization parameters that are previously decoded adjacent to the decoding object block, quantization parameters of adjacent blocks that are previously decoded, and a set of quantization parameters of adjacent blocks that are previously decoded. Here, the adjacent blocks that are previously decoded mean blocks that are previously decoded among blocks positioned spatially adjacent to the decoding object block.

As another example, the apparatus for decoding an image may predict the quantization parameter of the decoding object block using quantization parameters of blocks that have a depth shallower than that of the decoding object block among blocks that are previously decoded. Here, the block used to predict the quantization parameter may include at least one of a block that is decoded before the decoding object block in the decoding order and a block that has a depth shallower than that of the decoding object block. Here, the block that has a depth shallower than that of the decoding object block may be previously decoded before the decoding object block.

As another example, the apparatus for decoding an image may predict the quantization parameter of the decoding object block using quantization parameters of blocks that have a size larger than that of the decoding object block among blocks that are previously decoded. Here, the block used to predict the quantization parameter may include at least one of a block that is decoded before the decoding object block in the decoding order and a block that has a size larger than that of the decoding object block. Here, the block that has a size larger than that of the decoding object block may be previously decoded before the decoding object block.

As another example, the apparatus for decoding an image may predict the quantization parameter of the decoding object block using a quantization parameter of the decoding object block defined in the SPS, the PPS, or the slice header.

As another example, the apparatus for decoding an image may predict the quantization parameter of the decoding object block using a quantization parameter of a block having the same spatial position as that of the decoding object block in a slice or a picture that is previously decoded.

As another example, the apparatus for decoding an image may predict the quantization parameter of the decoding object block using at least one of quantization parameters of blocks that are decoded before the decoding object block in a Z scan order and quantization parameters of blocks that are present at the left based on the decoding object block and are previously decoded, as shown in FIG. 9.

Here, when a largest coding unit (LCU) quantization parameter is predicted, the quantization parameter of the decoding object block may be predicted from quantization parameters of blocks present in an LCU that is decoded before the decoding object block in a decoding order or a raster scan order or quantization parameters of blocks present in an LCU present at the left or the upper of the decoding object block.

Here, when a LCU quantization parameter is predicted, the quantization parameter of the decoding object block may be predicted using quantization parameters of blocks that are decoded before the decoding object block in a Z scan order or quantization parameters of adjacent blocks based on the decoding object block.

Here, when the LCU is present at the leftmost portion within a slice or a picture, the quantization parameter of the decoding object block may be predicted using one of a quantization parameter of the slice, a quantization parameter of the picture, quantization parameters of blocks present in an LCU that is decoded before the decoding object block in the decoding order or the raster scan order, and previously decoded quantization parameters of blocks previously present in the Z scan order.

Numerals in blocks of FIG. 9 indicate an order in which the quantization parameters are predicted. Within the LCU, the quantization parameter of the decoding object block may be predicted using the quantization parameters of the blocks that are decoded before the decoding object block in the Z scan order, and between the LCUs, the quantization parameter of the decoding object block may be predicted from the quantization parameters of the blocks present in the LCU that is decoded before the decoding object block in the decoding order or the raster scan order.

As another example, the apparatus for decoding an image may predict the quantization parameter of the decoding object block using quantization parameters of blocks that are previously decoded according to similarity of decoding parameters. Here, the decoding parameter may be a size of a block, a depth of transform, motion merge, a motion vector predictor, an intra prediction direction, a prediction mode, a motion vector, a reference picture index, a reference picture list, a coded block pattern, a coded block flag, or the like. When the decoding object block has a size of N X M, the quantization parameter may be predicted using blocks having a size of N X M among blocks adjacent to the decoding object block. When the decoding object block has a transform depth of N, the quantization parameter may be predicted using blocks having a transform depth of N among the blocks adjacent to the decoding object block. When motion merge is performed on the decoding object block, the quantization parameter may be predicted using blocks that become motion merge objects. When the decoding object block uses the motion vector predictor, the quantization parameter may be predicted using a block indicated by the corresponding motion vector predictor. When the decoding object block is intra decoded, the quantization parameter of the decoding object block may be predicted using quantization parameters of blocks decoded in the same intra prediction direction as or similar intra prediction direction to a corresponding intra prediction direction. When the decoding object block is intra decoded using restored pixels of upper blocks based on the decoding object block, the quantization parameter of the decoding object block may be predicted using quantization parameters of the upper blocks, and when the decoding object block is intra decoded using restored pixels of left blocks based on the decoding object block, the quantization parameter of the decoding object block may be predicted using quantization parameters of the left blocks. When the decoding object block is intra decoded, the quantization parameter of the decoding object block may be predicted using blocks used to decode an intra prediction mode (direction) of the decoding object block among the blocks adjacent to the decoding object block. For example, when an intra prediction mode of any one of the left blocks and the upper blocks based on the decoding object block is used in decoding the intra prediction mode of the decoding object block, the quantization parameter of the decoding object block may be predicted using quantization parameters of the used prediction block. The quantization parameter of the decoding object block may be predicted using quantization parameters of blocks decoded in the same prediction mode as that of the decoding object block. For example, when the decoding object block is inter decoded, the quantization parameter of the decoding object block may be predicted using quantization parameters of blocks decoded in an inter prediction mode among blocks adjacent to the decoding object block, and when the decoding object block is intra decoded, the quantization parameter of the decoding object block may be predicted using quantization parameters of blocks decoded in the intra prediction mode among the blocks adjacent to the decoding object block. Here, in the presence of a plurality of blocks decoded in the same prediction mode as that of the decoding object block, quantization parameters of the plurality of blocks may be used to predict the quantization parameter of the decoding object block. When the decoding object block is inter decoded, the quantization parameter of the decoding object block may be predicted using quantization parameters of blocks within a reference picture indicated by motion information of the decoding object block using a motion vector, a reference picture index, and a reference picture list, which correspond to the motion information. Here, when the decoding object block has at least two motion information, the number of quantization parameters of blocks within the reference picture may be at least two. When a residual signal is not present in a block that is previously decoded and a coded block pattern or a coded block flag is thus 0, a quantization parameter of a corresponding block may not be used to predict the quantization parameter of the decoding object block. Here, the fact that the coded block pattern or the coded block flag is 0 means that residual signals of a luminance component and a chrominance component are not decoded or a residual signal of a luminance component is not decoded.

The quantization parameter of the decoding object block may be predicted using at least one of the methods for predicting the quantization parameter of the decoding object block or a combination thereof.

Then, in operation (640), the apparatus for decoding an image may determine the quantization parameter of the decoding object block using the predicted quantization parameter of the decoding object block and the residual quantization parameter of the decoding object block.

Here, the apparatus for decoding an image may calculate the average of the predicted quantization parameters of the decoding object block and determine the quantization parameter of the decoding object block by adding the calculated average to the residual quantization parameter of the decoding object block.

In addition, the apparatus for decoding an image may also determine the quantization parameter of the decoding object block by adding the predicted quantization parameter to the residual quantization parameter.

As an example, when a quantization parameter of a block that is previously decoded in the decoding order is used as the predicted quantization parameter, the apparatus for decoding an image may determine the quantization parameter of the decoding object block by adding the quantization parameter of the block that is previously decoded in the decoding order to the residual quantization parameter. As another example, when a set of quantization parameters of a block that is previously decoded in the decoding order is used as the predicted quantization parameter, the apparatus for decoding an image may determine the quantization parameter of the decoding object block by adding any one of the quantization parameters configuring the set of quantization parameters of the block that is previously decoded in the decoding order to the residual quantization parameter. Here, when quantization parameter identification information is received from the apparatus for encoding an image, the apparatus for decoding an image may select a quantization parameter corresponding to the quantization parameter identification information among the quantization parameters configuring the set of quantization parameters of the block that is previously decoded in the decoding order. Then, the apparatus for decoding an image may determine the quantization parameter of the decoding object block by adding the selected quantization parameter to the residual quantization parameter.

As another example, when a quantization parameter of a block that is previously decoded at an upper of the decoding object block is used as the predicted quantization parameter, the apparatus for decoding an image may determine the quantization parameter of the decoding object block by adding the quantization parameter of the block that is previously decoded at the upper of the decoding object block to the residual quantization parameter.

As another example, when a set of quantization parameters of adjacent blocks is used as the predicted quantization parameter, the apparatus for decoding an image may determine the quantization parameter of the decoding object block by adding any one of the quantization parameters configuring the set of quantization parameters of the adjacent blocks to the residual quantization parameter. Here, when the quantization parameter identification information is received from the apparatus for encoding an image, the apparatus for decoding an image may select a quantization parameter corresponding to the quantization parameter identification information among the quantization parameters configuring the set of quantization parameters of the adjacent blocks. Then, the apparatus for decoding an image may determine the quantization parameter of the decoding object block by adding the selected quantization parameter to the residual quantization parameter.

As another example, when a set of quantization parameters of adjacent blocks is used as the predicted quantization parameter, the apparatus for decoding an image may determine the quantization parameter of the decoding object block by adding any one of the quantization parameters configuring the set of quantization parameters of the adjacent blocks to the residual quantization parameter. Here, when any one of the quantization parameters is used, a quantization parameter having a median value in the set of quantization parameters may be selected.

As another example, when a depth is used as the predicted quantization parameter, the apparatus for decoding an image may determine the quantization parameter of the decoding object block by adding quantization parameters of blocks that have a depth shallower than that of the decoding object block among the blocks that are previously decoded to the residual quantization parameter. Here, the block used to predict the quantization parameter may include at least one of a block that is decoded before the decoding object block in the decoding order and a block that has a depth shallower than that of the decoding object block.

As another example, when a size is used as the predicted quantization parameter, the apparatus for decoding an image may determine the quantization parameter of the decoding object block by adding quantization parameters of blocks that have a size larger than that of the decoding object block among the blocks that are previously decoded to the residual quantization parameter. Here, the block used to predict the quantization parameter may include at least one of a block that is decoded before the decoding object block in the decoding order and a block that has a size larger than that of the decoding object block.

As another example, when a quantization parameter defined in a slice header is used as the predicted quantization parameter, the apparatus for decoding an image may determine the quantization parameter of the decoding object block by adding the quantization parameter defined in the slice header to the residual quantization parameter.

As another example, in the presence of a quantization parameter in a block present at the left of the decoding object block, the apparatus for decoding an image may determine the quantization parameter of the decoding object block by adding the quantization parameter of the block present at the left of the decoding object block to the residual quantization parameter. Here, in the absence of the block at the left of the decoding object block or in the absence of a quantization parameter in the block present at the left of the decoding object block, the apparatus for decoding an image may determine the quantization parameter of the decoding object block by adding the quantization parameter of the block that is previously decoded in the decoding order to the residual quantization parameter.

The quantization parameter of the decoding object block may be determined by at least one of the methods for determining the quantization parameter of the decoding object block or a combination thereof.

Next, in operation (650), the apparatus for decoding an image may set the quantization parameter of the decoding object block in the decoding object block based on the determined quantization parameter of the decoding object block. Here, a process of operation (650) is the same as that of operation (530) of FIG. 5. Therefore, an overlapped description thereof will be omitted.

Figure 7:
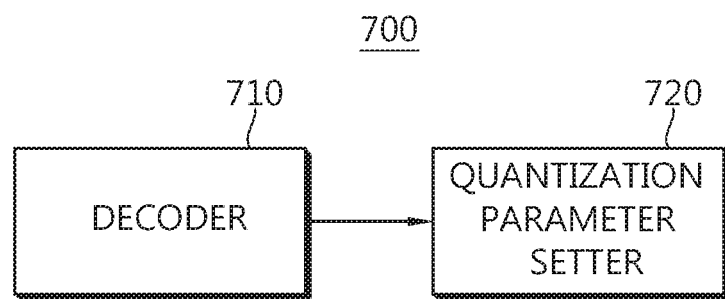
FIG. 7 is a block diagram showing a configuration of an apparatus for decoding an image according to an embodiment of the present invention.

FIG. 7 is a block diagram showing a configuration of an apparatus for decoding an image according to an embodiment of the present invention.

As shown in FIG. 7, an apparatus 700 for decoding an image may include a decoder 710 and a quantization parameter setter 720.

The decoder 710 may decode at least one of block information of a decoding object block and an encoded quantization parameter of the decoding object block.

As an example, the decoder 710 may entropy-decode encoded block information of the decoding object block extracted from the bitstream through demultiplexing. In addition, the decoder 710 may entropy-decode the encoded quantization parameter of the decoding object block based on the decoded block information.

As an example, the decoder 710 may entropy-decode the block information of the decoding object block in any one of a sequence parameter set (SPS), a picture parameter set (PPS), and a slice header in a configuration of the bitstream. In addition, the decoder 710 may decode the block information of the decoding object block and the quantization parameter of the decoding object block according to the method described in operations (510 and 520) of FIG. 5. A process of decoding the block information of the decoding object block and the quantization parameter of the decoding object block is the same as the process described in operations (510 and 520) of FIG. 5. Therefore, an overlapped description thereof will be omitted.

Here, when the apparatus for decoding an image previously knows the block information of the decoding object block, the decoder 710 may omit the operation of entropy-decoding the block information of the decoding object block from the bitstream. Likewise, when the apparatus for decoding an image previously knows the quantization parameter of the decoding object block, the decoder 710 may omit the operation of entropy-decoding the encoded quantization parameter of the decoding object block.

The quantization parameter setter 720 may set the quantization parameter in the decoding object block based on the decoded quantization parameter of the decoding object block. Here, an operation of setting the quantization parameter in the decoding object block has been described in detail in operation (530) of FIG. 5. Therefore, an overlapped description thereof will be omitted.

Figure 8:
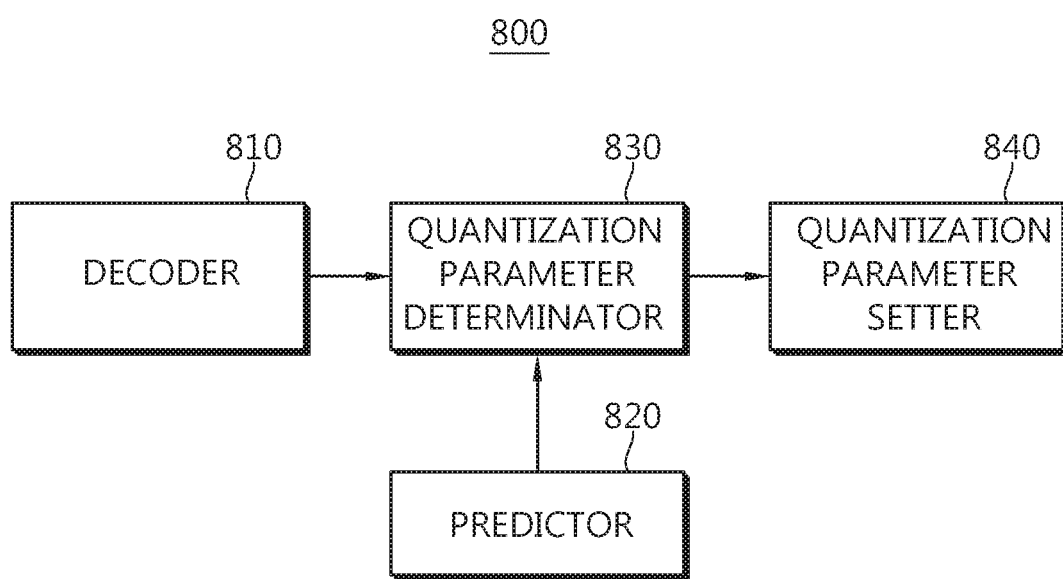
FIG. 8 is a block diagram showing a configuration of an apparatus for decoding an image based on a residual quantization parameter according to an embodiment of the present invention.

FIG. 8 is a block diagram showing a configuration of an apparatus for decoding an image based on a residual quantization parameter according to an embodiment of the present invention.

As shown in FIG. 8, an apparatus 800 for decoding an image may include a decoder 810, a predictor 820, a quantization parameter determinator 830, and a quantization parameter setter 840.

The decoder 810 may decode at least one of block information of a decoding object block and an encoded residual quantization parameter of the decoding object block.

As an example, the decoder 810 may entropy-decode encoded block information of the decoding object block extracted from a bitstream through demultiplexing. In addition, the decoder 810 may entropy-decode the encoded residual quantization parameter of the decoding object block based on the decoded block information.

Here, when the apparatus for decoding an image previously knows the block information of the decoding object block, the decoder 810 may omit the operation of entropy-decoding the block information of the decoding object block from the bitstream. Likewise, when the apparatus for decoding an image previously knows the quantization parameter of the decoding object block, the decoder 810 may omit the operation of entropy-decoding the encoded residual quantization parameter of the decoding object block.

The decoder 810 may decode the block information of the decoding object block and the residual quantization parameter of the decoding object block according to the method described in operations (510 and 520) of FIG. 5. A process of decoding the block information of the decoding object block and the residual quantization parameter of the decoding object block is the same as the process described in operations (510 and 520) of FIG. 5. Therefore, an overlapped description thereof will be omitted.

The predictor 820 may predict a quantization parameter of a decoding object block. Here, an operation of predicting the quantization parameter has been described in detail in operation (630) of FIG. 6. Therefore, an overlapped description thereof will be omitted.

The quantization parameter determinator 830 may determine a quantization parameter of the decoding object block based on the predicted quantization parameter of the decoding object block and the residual quantization parameter of the decoding object block.

As an example, the quantization parameter determinator 830 may determine the quantization parameter of the decoding object block by adding the predicted quantization parameter to the residual quantization parameter. Here, various operations of determining the quantization parameter of the decoding object block according to the predicted quantization parameter have been described in detail in operation (640) of FIG. 6. Therefore, an overlapped description thereof will be omitted.

As another example, the quantization parameter determinator 830 may calculate the average of the predicted quantization parameters and determine the quantization parameter of the decoding object block by adding the calculated average to the residual quantization parameter.

The quantization parameter setter 840 may set the quantization parameter in the decoding object block based on the determined quantization parameter of the decoding object block. Here, an operation of setting the quantization parameter in the decoding object block has been described in detail in operation (650) of FIG. 6. Therefore, an overlapped description thereof will be omitted.

When a residual signal is not present in a specific block or when the specific block is encoded in a pulse coded modulation (PCM) scheme, a quantization parameter of the specific block may be regarded as 0. That is, it may be determined that the specific block is a block in which a quantization parameter is not present.

The sequence parameter set (SPS) described above in FIGS. 1 to 8 may have a configuration as shown in the following Tables 1 to 3. Hereinafter, a quantization parameter will be used to generally represent a residual quantization parameter as well as a quantization parameter.

Table 1 shows an example of a sequence parameter set (SPS) including a syntax element representing quantization parameter information based on a depth or a size of a block.

TABLE 1

|  | C | Descriptor |
|---|---|---|
| seq_parameter_set_rbsp( ) { |  |  |
| profile_idc | 0 | u(8) |
| ... |  |  |

TABLE 1-continued

|  | C | Descriptor |
|---|---|---|
| log2_min_coding_unit_size_minus3 | 0 | ue(v) |
| log2_diff_max_min_coding_unit_size | 0 | ue(v) |
| ... |  |  |
| log2_min_transform_size_minus2 | 0 | ue(v) |
| log2_diff_max_min_transform_size | 0 | ue(v) |
| max_transform_hierarchy_depth_inter | 0 | ue(v) |
| max_transform_hierarchy_depth_intra | 0 | ue(v) |
| qp_hierarchy_depth | 0 | ue(v) |
| log2_qp_unit_size | 0 | ue(v) |
| ... |  |  |
| rbsp_trailing_bits( ) | 0 |  |
| } |  |  |

In Table 1, qp_hierarchy_depth indicates a syntax element representing a specific depth of a block in which a quantization parameter is set, encoded, or decoded, and log2_qp_unit_size indicates a syntax element representing a specific size of a block in which a quantization parameter is set, encoded, or decoded. Here, the SPS may include only any one syntax element of qp_hierarchy_depth and log2_qp_unit_size.

For example, when qp_hierarchy_depth is 1, a quantization parameter may be set, encoded, or decoded only with respect to a transform unit having depths of 0 and 1, which are depths of 1 or less, within a sequence. In the presence of block having a depth deeper than 1, which is a depth of a block in which a quantization parameter is set, it is possible to set a quantization parameter of the block having the deeper depth so as to be the same as the quantization parameter set at the depth of 1.

For example, when log2_qp_unit_size is 3, a quantization parameter may be set, encoded, or decoded only with respect to a block having a size of 8×8 or more, within a sequence. In the presence of a block having a size smaller than 8×8, which is a size of a block in which a quantization parameter is set, it is possible to set a quantization parameter of the block having the smaller size so as to be the same as the quantization parameter set at the size of 8×8.

Table 2 shows an example of a sequence parameter set (SPS) including a syntax element representing quantization parameter information based on a depth of a block in an inter-slice or an intra-slice.

TABLE 2

|  | C | Descriptor |
|---|---|---|
| seq_parameter_set_rbsp( ) { |  |  |
| profile_idc | 0 | u(8) |
| ... |  |  |
| log2_min_coding_unit_size_minus3 | 0 | ue(v) |
| log2_diff_max_min_coding_unit_size | 0 | ue(v) |
| ... |  |  |
| log2_min_transform_size_minus2 | 0 | ue(v) |
| log2_diff_max_min_transform_size | 0 | ue(v) |
| max_transform_hierarchy_depth_inter | 0 | ue(v) |
| max_transform_hierarchy_depth_intra | 0 | ue(v) |
| qp_hierarchy_depth_inter | 0 | ue(v) |
| qp_hierarchy_depth_intra | 0 | ue(v) |
| ... |  |  |
| rbsp_trailing_bits( ) | 0 |  |
| } |  |  |

In Table 2, qp_hierarchy_depth_inter indicates a syntax element representing a specific depth of a block in which a quantization parameter is set, encoded, or decoded in an inter-slice, and qp_hierarchy_depth_intra indicates a syntax element representing a specific depth of a block in which a quantization parameter is set, encoded, or decoded in an intra-slice. Here, the SPS may include only any one syntax element of qp_hierarchy_depth_inter and qp_hierarchy_depth_intra.

For example, when qp_hierarchy_depth_inter is 1, a quantization parameter may be set, encoded, or decoded only with respect to a transform unit having depths of 0 and 1, which are depths of 1 or less, in an inter-slice within a sequence. In the presence of a block having a depth deeper than 1, which is a depth of a block in which a quantization parameter is set, it is possible to set a quantization parameter of the block having the deeper depth so as to be the same as the quantization parameter set at the depth of 1.

For example, when qp_hierarchy_depth_intra is 2, a quantization parameter may be set, encoded, or decoded only with respect to a transform unit having depths of 0, 1, and 2 where are depths of 2 or less, in the intra-slice within the sequence. In the presence of a block having a depth deeper than 2, which is a depth of a block in which a quantization parameter is set, it is possible to set a quantization parameter of the block having the deeper depth so as to be the same as the quantization parameter set at the depth of 2.

Table 3 shows an example of a sequence parameter set (SPS) including a syntax element representing quantization parameter information based on a size of a block in an inter-slice or an intra-slice.

TABLE 3

| | C | Descriptor |
|---|---|---|
| seq_parameter_set_rbsp( ) { | | |
| profile_idc | 0 | u(8) |
| ... | | |
| log2_min_coding_unit_size_minus3 | 0 | ue(v) |
| log2_diff_max_min_coding_unit_size | 0 | ue(v) |
| ... | | |
| log2_min_transform_size_minus2 | 0 | ue(v) |
| log2_diff_max_min_transform_size | 0 | ue(v) |
| max_transform_hierarchy_depth_inter | 0 | ue(v) |
| max_transform_hierarchy_depth_intra | 0 | ue(v) |
| log2_qp_unit_size_inter | 0 | ue(v) |
| log2_qp_unit_size_intra | 0 | ue(v) |
| ... | | |
| rbsp_trailing_bits( ) | 0 | |
| } | | |

In Table 3, log2_qp_unit_size_inter indicates a syntax element representing a specific size of a block in which a quantization parameter is set, encoded, or decoded in an inter-slice, and log2_qp_unit_size_intra indicates a syntax element representing a specific size of a block in which a quantization parameter is set, encoded, or decoded in an intra-slice. Here, the SPS may include only any one syntax element of log2_qp_unit_size_inter and log2_qp_unit_size_intra.

For example, when log2_qp_unit_size_inter is 3, a quantization parameter may be set, encoded, or decoded only with respect to a block having a size of 8×8 or more, in an inter-slice within a sequence. In the presence of a block having a size smaller than 8×8, which is a size of a block in which a quantization parameter is set, it is possible to set a quantization parameter of the block having the smaller size so as to be the same as the quantization parameter set at the size of 8×8.

For example, when log2_qp_unit_size_intra is 4, a quantization parameter may be set, encoded, or decoded only with respect to a block having a size of 16×16 or more, in an intra-slice within a sequence. In the presence of a block having a size smaller than 16×16, which is a size of a block in which a quantization parameter is set, it is possible to set a quantization parameter of the block having the smaller size so as to be the same as the quantization parameter set at the size of 16×16.

The picture parameter set (PPS) described above in FIGS. 1 to 8 may have a configuration as shown in the following Tables 4 to 5. Hereinafter, a quantization parameter will be used to generally represent a residual quantization parameter as well as a quantization parameter.

Table 4 shows an example of a picture parameter set (PPS) including a syntax element representing a specific depth or a specific size of a block in which a quantization parameter is set.

TABLE 4

| | C | Descriptor |
|---|---|---|
| pic_parameter_set_rbsp( ) { | | |
| pic_parameter_set_id | 1 | ue(v) |
| seq_parameter_set_id | 1 | ue(v) |
| entropy_coding_mode_flag | 1 | u(1) |
| num_ref_idx_l0_default_active_minus1 | 1 | ue(v) |
| num_ref_idx_l1_default_active_minus1 | 1 | ue(v) |
| pic_init_qp_minus26 /* relative to 26 */ | 1 | se(v) |
| qp_hierarchy_depth | 1 | ue(v) |
| log2_qp_unit_size | 1 | ue(v) |
| constrained_intra_pred_flag | 1 | u(1) |
| for(i=0;i<15; i++){ | | |
| numAllowedFilters[i] | 1 | ue(v) |
| for(j=0;j<numAllowedFilters;j++){ | | |
| filtIdx[i][j] | 1 | ue(v) |
| } | | |
| } | | |
| rbsp_trailing_bits( ) | 1 | |
| } | | |

In Table 4, qp_hierarchy_depth indicates a syntax element representing a specific depth of a block in which a quantization parameter is set, encoded, or decoded, and log2_qp_unit_size indicates a syntax element representing a specific size of a block in which a quantization parameter is set, encoded, or decoded. Here, the PPS may include only any one syntax element of qp_hierarchy_depth and log2_qp_unit_size.

For example, when qp_hierarchy_depth is 1, a quantization parameter may be set, encoded, or decoded only with respect to a transform unit having depths of 0 and 1, which are depths of 1 or less, within a picture. In the presence of a block having a depth deeper than 1, which is a depth of a block in which a quantization parameter is set, it is possible to set a quantization parameter of the block having the deeper depth so as to be the same as the quantization parameter set at the depth of 1.

For example, when log2_qp_unit_size is 3, a quantization parameter may be set, encoded, or decoded only with respect to a block having a size of 8×8 or more, within a picture. In the presence of a block having a size smaller than 8×8, which is a size of a block in which a quantization parameter is set, it is possible to set a quantization parameter of the block having the smaller size so as to be the same as the quantization parameter set at the size of 8×8.

Table 5 shows an example of a picture parameter set (PPS) including a syntax element associated with quantization parameter changeable information.

TABLE 5

| | C | Descriptor |
|---|---|---|
| pic_parameter_set_rbsp( ) { | | |
|   pic_parameter_set_id | 1 | ue(v) |
|   seq_parameter_set_id | 1 | ue(v) |
|   entropy_coding_mode_flag | 1 | u(1) |
|   num_ref_idx_l0_default_active_minus1 | 1 | ue(v) |
|   num_ref_idx_l1_default_active_minus1 | 1 | ue(v) |
|   pic_init_qp_minus26 /* relative to 26 */ | 1 | se(v) |
|   qp_change_allowed_flag | 1 | u(1) |
|   constrained_intra_pred_flag | 1 | u(1) |
|   for(i=0;i<15; i++){ | | |
|     numAllowedFilters[i] | 1 | ue(v) |
|     for(j=0;j<numAllowedFilters;j++){ | | |
|       filtIdx[i][j] | 1 | ue(v) |
|     } | | |
|   } | | |
|   rbsp_trailing_bits( ) | 1 | |
| } | | |

In Table 5, qp_change_allowed_flag indicates a syntax element associated with quantization parameter changeable information. The apparatus for decoding an image may decode qp_change_allowed_flag in the PPS. When a logical value of qp_change_allowed_flag is 1, the apparatus for decoding an image may decode a quantization parameter in a unit lower than a picture to thereby change the quantization parameter and set the quantization parameter according to the changed value. In addition, when a logical value of qp_change_allowed_flag is 0, the apparatus for decoding an image may neither decode the quantization parameter in the unit lower than the picture nor change the quantization parameter.

The slice header described above in FIGS. 1 to 8 may have a configuration as shown in the following Tables 6 to 7. Hereinafter, a quantization parameter will be used to generally represent a residual quantization parameter as well as a quantization parameter.

Table 6 shows an example of a slice header including a syntax element representing a specific depth or a specific size of a block in which a quantization parameter is set.

TABLE 6

| | C | Descriptor |
|---|---|---|
| slice_header( ) { | | |
|   first_lctb_in_slice | 2 | ue(v) |
|   slice_type | 2 | ue(v) |
|   pic_parameter_set_id | 2 | ue(v) |
|   frame_num | 2 | u(v) |
|   ... | | |
|   ref_pic_list_modification( ) | | |
|   ... | | |
|   slice_qp_delta | 2 | se(v) |
|   qp_hierarchy_depth | 1 | ue(v) |
|   log2_qp_unit_size | 1 | ue(v) |
|   ... | | |
|   alf_param( ) | | |
|   if ( slice_type = = B && mv_competition_flag) | | |
|     collocated_from_l0_flag | 2 | u(1) |
| } | | |

In Table 6, qp_hierarchy_depth indicates a syntax element representing a specific depth of a block in which a quantization parameter is set, encoded, or decoded, and log2_qp_unit_size indicates a syntax element representing a specific size of a block in which a quantization parameter is set, encoded, or decoded. Here, the slice header may include only any one syntax element of qp_hierarchy_depth and log2_qp_unit_size.

For example, when qp_hierarchy_depth is 3, a quantization parameter may be set, encoded, or decoded only with respect to a transform unit having depths of 0, 1, and 2, which are depths of 3 or less, within a slice. In the presence of a block having a depth deeper than 3, which is a depth of a block in which a quantization parameter is set, it is possible to set a quantization parameter of the block having the deeper depth so as to be the same as the quantization parameter set at the depth of 3.

For example, when log2_qp_unit_size is 4, a quantization parameter may be set, encoded, or decoded only with respect to a block having a size of 16×16 or more, within a slice. In the presence of a block having a size smaller than 16×16, which is a size of a block in which a quantization parameter is set, it is possible to set a quantization parameter of the block having the smaller size so as to be the same as the quantization parameter set at the size of 16×16.

Table 7 shows an example of a slice header including a syntax element representing a specific depth or a specific size of a block in which a quantization parameter is set in a specific slice type.

TABLE 7

| | C | Descriptor |
|---|---|---|
| slice_header( ) { | | |
|   first_lctb_in_slice | 2 | ue(v) |
|   slice_type | 2 | ue(v) |
|   pic_parameter_set_id | 2 | ue(v) |
|   frame_num | 2 | u(v) |
|   ... | | |
|   ref_pic_list_modification( ) | | |
|   ... | | |
|   slice_qp_delta | 2 | se(v) |
|   if( slice_type = = P || slice_type = = B ) { | | |
|     qp_hierarchy_depth | 1 | ue(v) |
|     log2_qp_unit_size | 1 | ue(v) |
|   } | | |
|   ... | | |
|   alf_param( ) | | |
|   if ( slice_type = = B && mv_competition_flag) | | |
|     collocated_from_l0_flag | 2 | u(1) |
| } | | |

In Table 7, qp_hierarchy_depth indicates a syntax element representing a specific depth of a block in which a quantization parameter is set, encoded, or decoded only in a specific slice type, and log2_qp_unit_size indicates a syntax element representing a specific size of a block in which a quantization parameter is set, encoded, or decoded only in a specific slice type. Here, the slice header may include only any one syntax element of qp_hierarchy_depth and log2_qp_unit_size.

For example, when qp_hierarchy_depth is 3, a quantization parameter may be set, encoded, or decoded only with respect to a transform unit having depths of 0, 1, and 2, which are depths of 3 or less, within a P slice. In the presence of a block having a depth deeper than 3, which is a depth of a block in which a quantization parameter is set, it is possible to set a quantization parameter of the block having the deeper depth so as to be the same as the quantization parameter set at the depth of 3.

For example, when log2_qp_unit_size is 4, a quantization parameter may be set, encoded, or decoded only with respect to a block having a size of 16×16 or more, within a B slice. In the presence of a block having a size smaller than 16×16, which is a size of a block in which a quantization parameter is set, it is possible to set a quantization parameter of the block having the smaller size so as to be the same as the quantization parameter set at the size of 16×16.

Table 8 shows an example of an encoding block in which a quantization parameter is set, encoded, or decoded according to a syntax element representing a size of the block in which the quantization parameter is set, encoded, or decoded.

TABLE 8

|  | C | Descriptor |
|---|---|---|
| coding_unit( x0, y0, currCodingUnitSize ) { | 2 | |
| if(log2CUSize>log2_qp_unit_size) | 2 | |
| coding_unit_qp_delta | 2 | se(v) |
| if(x0 + ( 1 << log2CUSize ) = PicWidthInSamplesL &&y0 + ( 1 << log2CUSize ) = PicHeightInSamplesL &&log2CUSize > Log2MinCUSize ) | 2 | |
| split_coding_unit_flag | 2 | u(1) \| ae(v) |

In Table 8, log2_qp_unit_size indicates a syntax element representing a specific size of a block in which a quantization parameter is set, encoded, or decoded, coding_unit_qp_delta indicates a residual quantization parameter in a coding unit, and log2CUSize indicates a size of an encoding or decoding object coding unit. Here, the coding unit may include a residual quantization parameter only up to at a specific size of a block according to a size thereof. In addition, in the presence of a block having a size smaller than a specific size of a block in which a quantization parameter is set, it is possible to set a quantization parameter of the block having the smaller size so as to be the same as the quantization parameter set at the specific size, thereby omitting a process of encoding and decoding the quantization parameter of the block having the smaller size. In addition, the apparatus for encoding an image may set and transmit quantization parameters for each of all coding units having a size of a specific block size or more.

For example, when log2CUSize is 4 and log2_qp_unit_size is 3, an encoding and decoding object encoding block has a size of 16×16, and a coding unit in which a quantization parameter is set, encoded, or decoded has a size of 8×8. Therefore, coding_unit_qp_delta, which is a residual quantization parameter of a coding unit, may be set, encoded, or decoded in a corresponding coding unit.

Table 9 shows an example of an encoding block including a syntax element representing a depth of a block in which a quantization parameter is set, encoded, or decoded.

TABLE 9

|  | C | Descriptor |
|---|---|---|
| transform_tree( x0, y0, log2TrafoSize, trafoDepth, blkIdx ) { | | |
| if(trafoDepth = = 0 && intra_split_flag = = 0){ | | |
| if( !entropy_coding_mode_flag ) { | | |
| cbp_yuv_root | | vlc(n, v) |
| ... | | |
| residualDataPresentFlag = (cbp_yuv_root != 0) | | |
| } | | |
| else { | | |
| if( PredMode != MODE_INTRA ) | | |
| no_residual_data_flag | 3 \| 4 | u(1) \| ae(v) |
| residualDataPresentFlag = !no_residual_data_flagb | | |
| } | | |
| } else { | | |
| ... | | |
| residualDataPresentFlag = true | | |
| } | | |
| if( residualDataPresentFlag) { | | |
| if(trafoDepth < qp_hierarchy_depth) | | |
| transform_unit_qp_delta | 3 \| 4 | se(v) |
| ... | | |

In Table 9, qp_hierarchy_depth indicates a specific depth of a block in which a quantization parameter is set, transform_unit_qp_delta indicates a residual quantization parameter in a transform unit, trafoDepth indicates a depth of an encoding and decoding object transform unit, and residualDataPresentFlag indicates whether or not a residual signal to be encoded and decoded is present. Here, the apparatus for encoding and decoding an image may include residual quantization parameters of an encoding object block and a decoding object block only up to at a specific depth of the block according to a depth of the transform unit.

In addition, in the presence of a block having a depth deeper than a specific depth of a block in which a quantization parameter is decoded, it is possible to set a quantization parameter of the block having the depth deeper than the specific depth so as to be the same as the quantization parameter set at the specific depth, thereby omitting a process of encoding and decoding the quantization parameter of the block having the deeper depth.

Further, only in the presence of a residual signal to be encoded and a transform unit has a depth shallower than qp_hierarchy_depth, the apparatus for encoding an image may set and transmit the quantization parameter in the transform unit, and the apparatus for decoding an image may receive and set the quantization parameter in the transform unit.

For example, when residualDataPresentFlag is 1, trafoDepth is 2, and qp_hierarchy_depth is 3, a residual signal is present in an encoding and decoding object transform unit, the encoding and decoding object transform unit has a depth of 2, and a block in which a quantization parameter is set, encoded, or decoded has a depth of 3. Therefore, transform_unit_qp_delta, which is a residual quantization parameter in a transform unit, may be set, encoded, or decoded in the transform unit Table 10 shows an example of a transform unit in the case in which the transform unit in which a quantization parameter is set has a specific depth fixed to 1. That is, Table 10 shows an example of a transform unit does not include a syntax element representing a depth of a block in which a quantization parameter is set, encoded, or decoded.

TABLE 10

|  | C | Descriptor |
|---|---|---|
| transform_tree( x0, y0, log2TrafoSize, trafoDepth, blkIdx ) { | | |
| if(trafoDepth = = 0 && intra_split_flag = = 0){ | | |
| if( !entropy_coding_mode_flag ) { | | |
| cbp_yuv_root | | vlc(n, v) |
| ... | | |
| residualDataPresentFlag = (cbp_yuv_root != 0) | | |
| } | | |
| else { | | |
| if( PredMode != MODE_INTRA ) | | |
| no_residual_data_flag | 3 \| 4 | u(1) \| ae(v) |
| residualDataPresentFlag = !no_residual_data_flagb | | |
| } else { | | |
| ... | | |
| residualDataPresentFlag = true | | |
| } | | |
| if( residualDataPresentFlag) { | | |
| if(trafoDepth < 1) | | |
| transform_unit_qp_delta | 3 \| 4 | se(v) |
| ... | | |

In Table 10, trafoDepth indicates a depth of an encoding and decoding object transform unit, and residualDataPresentFlag indicates whether or not a residual signal is present in the encoding and decoding object transform unit. Here, when trafoDepth is 0, the apparatus for encoding an image may perform transform at the same size as that of the coding unit. In addition, only in the presence of a residual signal, transform_unit_qp_delta may be transmitted. Here, since trafoDepth is smaller than 1, a quantization parameter may be set only at the shallowest depth in the encoding and decoding object transform unit, and transform_unit_qp_delta may be encoded and decoded. That is, the quantization parameter may be set in a transform unit having the same size as that of the coding unit, and transform_unit_qp_delta may be encoded and decoded. Further, in the case of a transform unit having a depth that is the same as 1 or is deeper than 1, a quantization parameter that is the same as the quantization parameter set at the shallowest depth is set, thereby omitting encoding and decoding thereof. That is, only in the presence of a residual signal to be encoded in a transform unit having the same size as that of the coding unit, a quantization parameter is set, and a residual quantization parameter is encoded and decoded.

Table 11 shows an example of a transform unit including a syntax element representing a size and a depth of a block in which a quantization parameter is set.

TABLE 11

|  | C | Descriptor |
|---|---|---|
| transform_tree( x0, y0, log2TrafoSize, trafoDepth, blkIdx ) { | | |
| ... | | |
| if(log2CUSize > log2_qp_unit_size &&trafoDepth == 0 && residualDataPresentFlag) { | | |
| unit_qp_delta | 3 \| 4 | se(v) |
| ... | | |

In Table 11, log2_qp_unit_size indicates a specific size of a unit in which a quantization parameter is set, encoded, or decoded, unit_qp_delta indicates a residual quantization parameter of a transform unit, trafoDepth indicates a depth of an encoding or decoding object transform unit, and residualDataPresentFlag indicates whether or not a residual signal to be encoded or decoded is present. Here, the transform unit may include a residual quantization parameter only up to at a specific size of a block according to a size of the coding unit. In addition, in the presence of a block having a size smaller than a specific size of a block in which a quantization parameter is set, it is possible to set a quantization parameter of the block having the smaller size so as to be the same as the quantization parameter set at the specific size, thereby omitting a process of encoding and decoding the residual quantization parameter of the block having the smaller size. In addition, the apparatus for encoding and decoding an image may set, encode, and decode quantization parameters for all coding units having a size of a specific block size or more. In addition, since the transform unit has a depth of 0, the apparatus for encoding and decoding an image may perform transform and inverse transform at the same size as that of the coding unit.

For example, when log2CUSize is 3, log2_qp_unit_size is 2, trafoDepth is 0, and residualDataPresentFlag is 1, an encoding or decoding object coding unit has a size of 8×8, a coding unit in which a quantization parameter is set, encoded, or decoded has a size of 4×4, a transform unit has a depth of 0, and a residual signal is present. Therefore, unit_qp_delta, which is a residual quantization parameter in a transform unit, may be set, encoded, or decoded in a corresponding coding unit.

Table 12 shows an example of a picture parameter set (PPS) including a syntax element associated with quantization parameter changeable information.

TABLE 12

|  | C | Descriptor |
|---|---|---|
| pic_parameter_set_rbsp( ) { | | |
| pic_parameter_set_id | 1 | ue(v) |
| seq_parameter_set_id | 1 | ue(v) |
| entropy_coding_mode_flag | 1 | u(1) |
| num_ref_idx_l0_default_active_minus1 | 1 | ue(v) |
| num_ref_idx_l1_default_active_minus1 | 1 | ue(v) |
| pic_init_qp_minus26 /* relative to 26 */ | 1 | se(v) |
| minCUDQPsize | 1 | f(4) |
| constrained_intra_pred_flag | 1 | u(1) |
| for(i=0;i<15; i++){ | | |
| numAllowedFilters[i] | 1 | ue(v) |
| for(j=0;j<numAllowedFilters;j++){ | | |
| filtIdx[i][j] | 1 | ue(v) |
| } | | |
| } | | |
| rbsp_trailing_bits( ) | 1 | |
| } | | |

In Table 12, minCUDQPsize indicates a syntax element representing a specific size of a block in which a quantization parameter is set, encoded, or decoded.

For example, when minCUDQPsize is 0, a quantization parameter may be set, encoded, or decoded only with respect to a block having the same size as that of a LCU, within a picture. When minCUDQPsize is 1, a quantization parameter may be set, encoded, or decoded with respect to a block having the same size as or larger size than that of a block having a width and a height that are half of those of the LCU. That is, when the LCU is 64×64 and minCUDQPsize is 1, a quantization parameter may be set, encoded, or decoded only with respect to a block having the same size as or larger size than 32×32. That is, when minCUDQPsize is N, a quantization parameter may be set, encoded, or decoded only with respect to a block having the same size as or larger size than that of a block having a width and a height that are half of those in the case in which minCUDQPsize is N-1. Where N indicates a positive integer. In the presence of a block having a size smaller than a specific size of the block in which the quantization parameter is set, it is possible to set a quantization parameter of the block having the smaller size so as to be the same as the quantization parameter set at the specific size.

In addition, minCUDQPsize may be encoded to have M bits of fixed length or a variable length. Where M indicates a positive integer. The above Table 12 shows an example in which M is 4.

In addition, minCUDQPsize is not transmitted in the PPS or the slice header and a fixed block size is predefined in an encoder or a decoder, such that a quantization parameter may be set, encoded, or decoded only with respect to a block having the same size as or larger size than that of the fixed block size. Where N indicates a positive integer.

Table 13 shows an example of a slice header including a syntax element associated with quantization parameter changeable information.

TABLE 13

| | C | Descriptor |
|---|---|---|
| slice_header( ) { | | |
| first_lctb_in_slice | 2 | ue(v) |
| slice_type | 2 | ue(v) |
| pic_parameter_set_id | 2 | ue(v) |
| frame_num | 2 | u(v) |
| ... | | |
| ref_pic_list_modification( ) | | |
| ... | | |
| slice_qp_delta | 2 | se(v) |
| minCUDQPsize | 1 | f(4) |
| ... | | |
| alf_param( ) | | |
| if ( slice_type = = B && mv_competition_flag) | | |
| collocated_from_l0_flag | 2 | u(1) |
| } | | |

In Table 13, minCUDQPsize indicates a syntax element representing a specific size of a block in which a quantization parameter is set, encoded, or decoded.

For example, when minCUDQPsize is 0, a quantization parameter may be set, encoded, or decoded only with respect to a block having the same size as that of a LCU, within a slice. When minCUDQPsize is 1, a quantization parameter may be set, encoded, or decoded with respect to a block having the same size as or larger size than that of a block having a width and a height that are half of those of the LCU. That is, when the LCU is 64×64 and minCUDQPsize is 1, a quantization parameter may be set, encoded, or decoded only with respect to a block having the same size as or larger size than 32×32. That is, when minCUDQPsize is N, a quantization parameter may be set, encoded, or decoded only with respect to a block having the same size as or larger size than that of a block having a width and a height that are half of those in the case in which minCUDQPsize is N-1. Where N indicates a positive integer. In the presence of a block having a size smaller than a specific size of the block in which the quantization parameter is set, it is possible to set a quantization parameter of the block having the smaller size so as to be the same as the quantization parameter set at the specific size.

In addition, minCUDQPsize may be encoded to have M bits of fixed length or a variable length. Where M indicates a positive integer.

Table 14 shows an example of a LCU syntax (a coding tree syntax) including a syntax element associated with quantization parameter changeable information.

TABLE 14

| | Descriptor |
|---|---|
| coding_tree( x0, y0, log2CUSize ) { | |
| if( x0 + ( 1 << log2CUSize ) <= PicWidthInSamplesL &&y0 + ( 1 << log2CUSize ) <= PicHeightInSamplesL &&log2CUSize > Log2MinCUSize ) | |
| split_coding_unit_flag[ x0 ][ y0 ] | u(1) \| ae(v) |
| if (Log2MaxCUSize == log2CUSize && split_coding_unit_flag[ x0 ][ y0 ]) | |
| lcu_qp_level | ue(v) |
| if( adaptive_loop_filter_flag && alf_cu_control_flag ) { | |
| cuDepth = Log2MaxCUSize log2CUSize | |
| if( cuDepth <= alf_cu_control_max_depth ) | |
| if( cuDepth == alf_cu_control_max_depth \|\| split_coding_unit_flag[ x0 ][ y0 ] == 0 ) | |
| AlfCuFlagIdx++ | |
| } | |

TABLE 14-continued

| | Descriptor |
|---|---|
| if( split_coding_unit_flag[ x0 ][ y0 ] ) { | |
| x1 = x0 + ( ( 1 << log2CUSize ) >> 1 ) | |
| y1 = y0 + ( ( 1 << log2CUSize ) >> 1 ) | |
| coding_tree( x0, y0, log2CUSize 1 ) | |
| if( x1 < PicWidthInSamplesL ) | |
| coding_tree( x1, y0, log2CUSize – 1 ) | |
| if( y1 < PicHeightInSamplesL ) { | |
| coding_tree( x0, y1, log2CUSize – 1 ) | |
| if( x1 < PicWidthInSamplesL && y1 < PicHeightInSamplesL ) | |
| coding_tree( x1, y1, log2CUSize – 1 ) | |
| } else { | |
| if(adaptive_loop_filter_flag && alf_cu_control_flag ) | |
| AlfCuFlag[ x0 ][ y0 ] = alf_cu_flag[ AlfCuFlagIdx ] | |
| coding_unit( x0, y0, log2CUSize ) | |
| } | |
| } | |

In Table 14, lcu_qp_level indicates a syntax element representing a specific size of a block in which a quantization parameter is set, encoded, or decoded. The specific size of the block in which the quantization parameter is set, encoded, or decoded may be calculated as follows.

QP_block_size=LCU_size>>lcu_qp_level

Where QP_block_size indicates a specific size of a block in which a quantization parameter is set, encoded, or decoded, and LCU_size indicates a size of a LCU.

In addition, lcu_qp_level is transmitted only when a corresponding LCU or block is divided, and a quantization parameter may be set, encoded, or decoded according to QP_block_size. For example, in Table 14, it may be appreciated that when split_coding_unit_flag[x0][y0] is 1, a corresponding block was divided and when split_coding_unit_flag[x0][y0] is 0, a corresponding block was not divided. In addition, only when split_coding_unit_flag[x0][y0] is 1 and a corresponding block has the same size as that of the LCU, a quantization parameter may be set, encoded, or decoded with respect to a block having the same size or larger size than QP_block_size.

In addition, lcu_qp_level is transmitted only when a residual signal is present in a corresponding LCU or block, and a quantization parameter may be set, encoded, or decoded according to the calculated QP_block_size.

For example, when lcu_qp_depth is 0, a quantization parameter may be set, encoded, or decoded only with respect to a block having the same size as that of the LCU. When lcu_qp_depth is 1, a quantization parameter may be set, encoded, or decoded with respect to a block having the same size as or larger size than that of a block having a width and a height that are half of those of the LCU. That is, when the LCU is 64×64 and lcu_qp_depth is 1, a quantization parameter may be set, encoded, or decoded only with respect to a block having the same size as or larger size than 32×32. That is, when lcu_qp_depth is N, a quantization parameter may be set, encoded, or decoded only with respect to a block having the same size as or larger size than that of a block having a width and a height that are half of those in the case in which lcu_qp_depth is N-1. Where N indicates a positive integer.

In addition, lcu_qp_depth may be encoded to have M bits of fixed length or a variable length. Where M indicates a positive integer.

Table 15 shows an example of a picture parameter set (PPS) including a syntax element associated with quantization parameter changeable information in which qp_change_allowed_flag of Table 5 and minCUDQPsize of Table 12 are integrated with each other.

TABLE 15

|  | C | Descriptor |
|---|---|---|
| pic_parameter_set_rbsp( ) { |  |  |
| pic_parameter_set_id | 1 | ue(v) |
| seq_parameter_set_id | 1 | ue(v) |
| entropy_coding_mode_flag | 1 | u(1) |
| num_ref_idx_l0_default_active_minus1 | 1 | ue(v) |
| num_ref_idx_l1_default_active_minus1 | 1 | ue(v) |
| pic_init_qp_minus26 /* relative to 26 */ | 1 | se(v) |
| cu_dqp_idc | 1 | ue(v) |
| constrained_intra_pred_flag | 1 | u(1) |
| for(i=0;i<15; i++){ |  |  |
| numAllowedFilters[i] | 1 | ue(v) |
| for(j=0;j<numAllowedFilters;j++){ |  |  |
| filtIdx[i][j] | 1 | ue(v) |
| } |  |  |
| } |  |  |
| rbsp_trailing_bits( ) | 1 |  |
| } |  |  |

In Table 15, cu_dqp_idc indicates a syntax element associated with quantization parameter changeable information. The apparatus for decoding an image may decode cu_dqp_idc in the PPS. When a value of cu_dqp_idc is 0, the apparatus for decoding an image may neither decode a quantization parameter in a unit lower than a picture nor change the quantization parameter in the unit lower than the picture. When a value of cu_dqp_idc is a positive number of larger than 0, the apparatus for decoding an image may change the quantization parameter in the unit lower than the picture, and the value of cu_dqp_idc may indicate a specific size of a block in which the quantization parameter is set, encoded, or decoded.

For example, when cu_dqp_idc is 1, a quantization parameter may be set, encoded, or decoded only with respect to a block having the same size as that of a LCU, within a picture. When cu_dqp_idc is 2, a quantization parameter may be set, encoded, or decoded with respect to a block having the same size as or larger size than that of a block having a width and a height that are half of those of the LCU. For example, when the LCU is 64×64 and cu_dqp_idc e is 2, a quantization parameter may be set, encoded, or decoded only with respect to a block having the same size as or larger size than 32×32. In the presence of a block having a size smaller than a specific size of the block in which the quantization parameter is set, it is possible to set a quantization parameter of the block having the smaller size so as to be the same as the quantization parameter set at the specific size.

Meanwhile, an order of each operation described in FIGS. 1, 2, 5 and 6 may be changed.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

Accordingly, the scope of the present invention is not construed as being limited to the described embodiments but is defined by the appended claims as well as equivalents thereto.

The invention claimed is:

1. A method for decoding an image, the method comprising:
    decoding base block size information on a size of a base block from a bitstream;
    decoding residual presence information of a decoding object unit from the bitstream, the residual presence information indicating whether the decoding object unit has residual signal or not;
    when the residual presence information indicates that the decoding object unit has the residual signal, decoding a residual quantization parameter of the decoding object unit from the bitstream;
    determining a quantization parameter of the decoding object unit based on the residual quantization parameter of the decoding object unit; and
    performing inverse quantization for the decoding object unit based on the quantization parameter,
    wherein the base block size information is decoded in a variable length decoding, and
    wherein when a size of the decoding object unit is smaller than a size of the base block specified by the base block size information, the quantization parameter of the decoding object unit is same as quantization parameters of all the other decoding units included in the base block together with the decoding object unit.

2. The method of claim 1, wherein the residual quantization parameter is selectively decoded based on quantization parameter flag information, the quantization parameter flag information specifying whether the residual quantization parameter is present in the bitstream.

3. The method of claim 1, wherein the residual quantization parameter is decoded when the decoding object unit has a first order among a plurality of units included in the base block.

4. A method for encoding an image, the method comprising:
    determining a size of a base block and encoding base block size information on the size of the base block into a bitstream;
    determining whether an encoding object unit has residual signal or not and encoding residual presence information of the encoding object unit into the bitstream, the residual presence information indicating whether the encoding object unit has residual signal or not;
    determining a quantization parameter of the encoding object unit;
    performing quantization for the encoding object unit based on the quantization parameter;
    when the residual presence information indicates that the encoding object unit has the residual signal, determining a residual quantization parameter of the encoding object unit based on the quantization parameter and encoding the residual quantization parameter into the bitstream;
    wherein the base block size information is encoded in a variable length encoding, and
    wherein when a size of the encoding object unit is smaller than a size of the base block specified by the base block size information, the quantization parameter of the encoding object unit is same as quantization parameters of all the other encoding units included in the base block together with the encoding object unit.

5. The method of claim 4, wherein the residual quantization parameter is selectively encoded based on quantization parameter flag information, the quantization parameter flag information specifying whether the residual quantization parameter is present in the bitstream.

6. The method of claim 4, wherein the residual quantization parameter is encoded when the encoding object unit has a first order among a plurality of units included in the base block.

7. A non-transitory computer-readable medium storing a bitstream, wherein the bitstream is generated by a method for encoding an image, the method comprising:
determining a size of a base block and encoding base block size information on the size of the base block into a bitstream;
determining whether an encoding object unit has residual signal or not and encoding residual presence information of the encoding object unit into the bitstream, the residual presence information indicating whether the encoding object unit has residual signal or not;
determining a quantization parameter of the encoding object unit;
performing quantization for the encoding object unit based on the quantization parameter;
when the residual presence information indicates that the encoding object unit has the residual signal, determining a residual quantization parameter of the encoding object unit based on the quantization parameter and encoding the residual quantization parameter into the bitstream;
wherein the base block size information is encoded in a variable length encoding, and
wherein when a size of the encoding object unit is smaller than a size of the base block specified by the base block size information, the quantization parameter of the encoding object unit is same as quantization parameters of all the other encoding units included in the base block together with the encoding object unit.

* * * * *